United States Patent
Wang et al.

(10) Patent No.: US 11,283,719 B2
(45) Date of Patent: Mar. 22, 2022

(54) CONTENT ADDRESSABLE MEMORY (CAM) BASED HARDWARE ARCHITECTURE FOR DATACENTER NETWORKING

(71) Applicant: Google LLC, Mountain View, CA (US)

(72) Inventors: Weihuang Wang, Los Gatos, CA (US); Srinivas Vaduvatha, San Jose, CA (US); Jiazhen Zheng, Sunnyvale, CA (US); Prashant Chandra, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/926,961

(22) Filed: Jul. 13, 2020

(65) Prior Publication Data
US 2022/0014468 A1  Jan. 13, 2022

(51) Int. Cl.
| | | |
|---|---|---|
| *H04L 12/743* | (2013.01) | |
| *G06F 15/173* | (2006.01) | |
| *H04L 12/26* | (2006.01) | |
| *H04L 12/801* | (2013.01) | |
| *H04L 45/745* | (2022.01) | |
| *H04L 43/10* | (2022.01) | |
| *H04L 47/34* | (2022.01) | |

(52) U.S. Cl.
CPC .... *H04L 45/7457* (2013.01); *G06F 15/17331* (2013.01); *H04L 43/10* (2013.01); *H04L 47/34* (2013.01)

(58) Field of Classification Search
CPC ... G06F 13/28; G06F 12/1081; H04L 12/935; H04L 29/06; H04L 69/22; H04L 12/28
See application file for complete search history.

(56) References Cited

U.S. PATENT DOCUMENTS

| | | |
|---|---|---|
| 7,219,188 B1 | 5/2007 | Pereira |
| 7,305,486 B2 | 12/2007 | Ghose et al. |
| 7,571,278 B2 | 8/2009 | Anthony, Jr. et al. |
| 7,817,634 B2 | 10/2010 | Coffman et al. |
| 7,870,217 B2 | 1/2011 | Pandya |
| 8,549,170 B2 | 10/2013 | Minami et al. |

(Continued)

OTHER PUBLICATIONS

Montazeri, Behnam et al. "Homa: A Receiver-Driven Low-Latency Transport Protocol Using Network Priorities." SIGCOMM '18, Aug. 20-25, 2018, Budapest, Hungary. pp. 221-235.

(Continued)

*Primary Examiner* — Iqbal Zaidi
(74) *Attorney, Agent, or Firm* — Lerner, David, Littenberg, Krumholz & Mentlik, LLP

(57) ABSTRACT

A communication protocol system is provided for reliable transport of packets. A content addressable memory hardware architecture including a reorder engine and a retransmission engine may be utilized for the reliable transport of the packets. In this regard, a reorder engine includes a content addressable memory (CAM) and one or more processors in communication with the CAM. The one or more processors are configured to receive a first set of data packets when executed by the one or more processors. The one or more processors are configured to access the content addressable memory to process the first set of data packets. The one or more processors are configured to save data information of the first set of the data packets in the content addressable memory.

13 Claims, 15 Drawing Sheets

(56) References Cited

U.S. PATENT DOCUMENTS

| | | | |
|---|---|---|---|
| 8,610,086 | B2 | 12/2013 | Wolleschensky et al. |
| 2004/0030770 | A1 | 2/2004 | Pandya |
| 2004/0049612 | A1* | 3/2004 | Boyd .................. H04L 49/9063 |
| | | | 710/52 |
| 2004/0165588 | A1 | 8/2004 | Pandya |
| 2006/0274787 | A1 | 12/2006 | Pong |
| 2008/0313364 | A1 | 12/2008 | Flynn et al. |
| 2014/0201318 | A1 | 7/2014 | Dajani et al. |
| 2017/0187598 | A1 | 6/2017 | Andreyev et al. |
| 2018/0102975 | A1 | 4/2018 | Rankin |
| 2019/0190542 | A1 | 6/2019 | Wang et al. |
| 2020/0314030 | A1* | 10/2020 | Goel ....................... H04L 69/22 |
| 2021/0089450 | A1* | 3/2021 | Simionescu .......... G06F 12/084 |

OTHER PUBLICATIONS

Rajiullah, Mohammad. "Towards a Low Latency Internet: Understanding and Solutions." Sep. 2015. Dissertation. Department of Computer Science, Karlstad University, Sweden. 58 pages.

Vernersson, Andreas. "Analysis of UDP-based Reliable Transport using Network Emulation." 2015. Master's Thesis. Master of Science in Engineering Technology Computer Science and Engineering. Luleå University of Technology. 93 pages.

Wu, Haitao et al. "ICTCP: Incast Congestion Control for TCP in Data-Center Networks." IEEE/ACM Transactions on Networking, vol. 21, No. 2, Apr. 2013. pp. 345-358.

Extended European Search Report for European Patent Application No. 21155513.1 dated Jul. 30, 2021. 9 pages.

* cited by examiner

CONTENT ADDRESSABLE MEMORY (CAM) BASED HARDWARE ARCHITECTURE FOR DATACENTER NETWORKING

BACKGROUND

The internet protocol suite is a set of communication protocols used for servicing data transmissions between two devices communicating information over a network. A packet is one form of data in which encapsulated data can be transmitted through networks based on control information that is stored in a head portion, such as a header, of the packet. Generally, if sequence numbers of the packets monotonically increase, it indicates the data flows through the network without loss. However, in some situations when multiple synchronized computing devices send data to a same receiver computing device in parallel, it often results in congestion, which undesirably slows down the data transmission speed as well as increasing the likelihood of data loss or data out of order.

Further, when a stream of packets is transmitted from the sending computing device to the receiving computing device, due to the number of different paths and other factors such as unexpected delay or equipment failure, the transmitted packets may also often arrive out of sequence or out of order at the receiving computing device. For example, one or more later data packets in a sequence may be routed through a different, faster path than earlier data packets causing the sequence to be out of order. Alternatively, a data packet or packets may be held at a device on the network for additional processing or may transmit in a slower queue in a network device causing later sequenced data packets to be sent ahead of earlier packets. Out-of-sequence or out-of-order packets make it difficult to scan the header information into the payload contents of packets. Inability to scan the entire contents of the data packets including the head portion and the payload information may result in difficulty in maintaining state information or awareness throughout an entire data traffic flow. Furthermore, in some of the communication systems that require ordered delivery of packets, a long tail latency, which is the amount of time for the last few packets among a series of packets to be transmitted, may prevent transmission of the next series of packets.

BRIEF SUMMARY

The present disclosure provides a communication protocol system for reliable transport of packets. A content addressable memory hardware architecture including a reorder engine and a retransmission engine may be utilized for the reliable transport of the packets. In this regard, a reorder engine includes a content addressable memory (CAM) and one or more processors in communication with the CAM. The one or more processors are configured to receive a first set of data packets when executed by the one or more processors. The one or more processors are configured to access the content addressable memory to process the first set of data packets. The one or more processors are configured to save data information of the first set of the data packets in the content addressable memory.

In some examples, the one or more processors are further configured to receive a second set of data packets. The one or more processors access the content addressable memory to process the second set of data packets received by the reorder engine. one or more processors compare data information of the second set of the data packets with the data information of the first set of the data packets.

In some examples, the one or more processors are further configured to determine if the second set of the data packets has out of order data packets. The one or more processors are further configured to reorder the out of order data packets prior to outputting the second set of the data packets. The data information includes a connection content or a sequence of numbers that identify an order of the data packets.

In one example, the one or more processors are further configured to perform Remote Direct Memory Access (RDMA) operations.

The present disclosure provides a method. The method includes receiving, by one or more processors, a first set of data packets from an input operation in a computing system. The method includes identifying, by one or more processors, a first plurality of sequence numbers associated with the first set of the data packet. The method includes saving, by one or more processors, a first order of the first plurality of sequence numbers in a content addressable memory in a reorder engine in the computing system prior to outputting the first set of data packets.

The method may further comprise identifying, by one or more processors, a second plurality of sequence numbers associated with a second set of the data packet from the input operation. The method may further comprise comparing, by one or more processors, a second order of the second plurality of sequence numbers with the first plurality of sequence numbers.

The method may further comprise identifying out-of-order data packets in the second plurality of data packets. The method may further comprise reordering the out-of-order data packets to match with the first order prior to outputting the second plurality of data packets.

The method may further comprise saving, by one or more processors, data information associated with the first set of the data packets in a content addressable memory in a retransmission engine in the computing system. The method may further comprise tracking, by one or more processors, data packets active in the computing system. The method may further comprise determining, by one or more processors, if a retransmission of data packets is necessary.

In one example, the input operation is a Remote Direct Memory Access (RDMA) operation. In one example, the first set of the data packet comprises one or more of push requests, pull requests, push solicited data, push unsolicited data, or acknowledges. In one example, the second set of data packet comprises one or more of push grant, push unsolicited data, pull response or acknowledgement.

The present disclosure still further provides a method. The method includes receiving, by an initiator entity, a plurality of data packets from an input operation. The method includes saving, by the initiator entity, data information in relation to the plurality of the data packets in a content addressable memory in a reorder engine in the initiator entity. The method includes transmitting, by the initiator entity, the plurality of the data packets to a target entity. The method includes receiving, by the initiator entity, a response from the target entity. The method includes performing, by the initiator entity, a look-up operation, in the content addressable memory in the reorder engine to compare the data information between the first plurality of data packets and the response.

In one example, the method further includes updating, by the initiator entity, the data information from the response. The data information comprises a plurality of sequence numbers of the data packets. The method further includes reordering out of order data packets from the response. The input operation is a Remote Direct Memory Access (RDMA) operation.

DETAILED DESCRIPTION

The technology generally relates to communication protocols for reliable transport (RT) of packets over a connection. A content addressable memory (CAM) based hardware architecture is utilized in the reliable transport (RT). The content addressable memory (CAM) is a memory that is addressable by content and provides a storage array random access memory (RAM). The content addressable memory may save an array of data entries and provide a table lookup operation. The table lookup operations may provide a look-up table, such as a look-up key, that may facilitate comparing an incoming array of data entries with the array of data entries stored in CAM, automatically and/or simultaneously, and decide whether the incoming data matches with the saved array of data entries stored in CAM. If the data entries match, CAM may provide an index of the array of the data entries for a data output. After the data is outputted, the CAM based hardware architecture may increment the data to further process a next incoming data comparison for the ordering requirement. In one example, the data being look-up in CAM includes RSNs (Request Sequence Numbers). By doing so, data reordering, resequencing, or retransmission may be performed, automatically and/or simultaneously, prior to sending to the destination receiving ports so as to minimize the data transmission loss or undesired out-of-order data transmissions.

Figure 1:
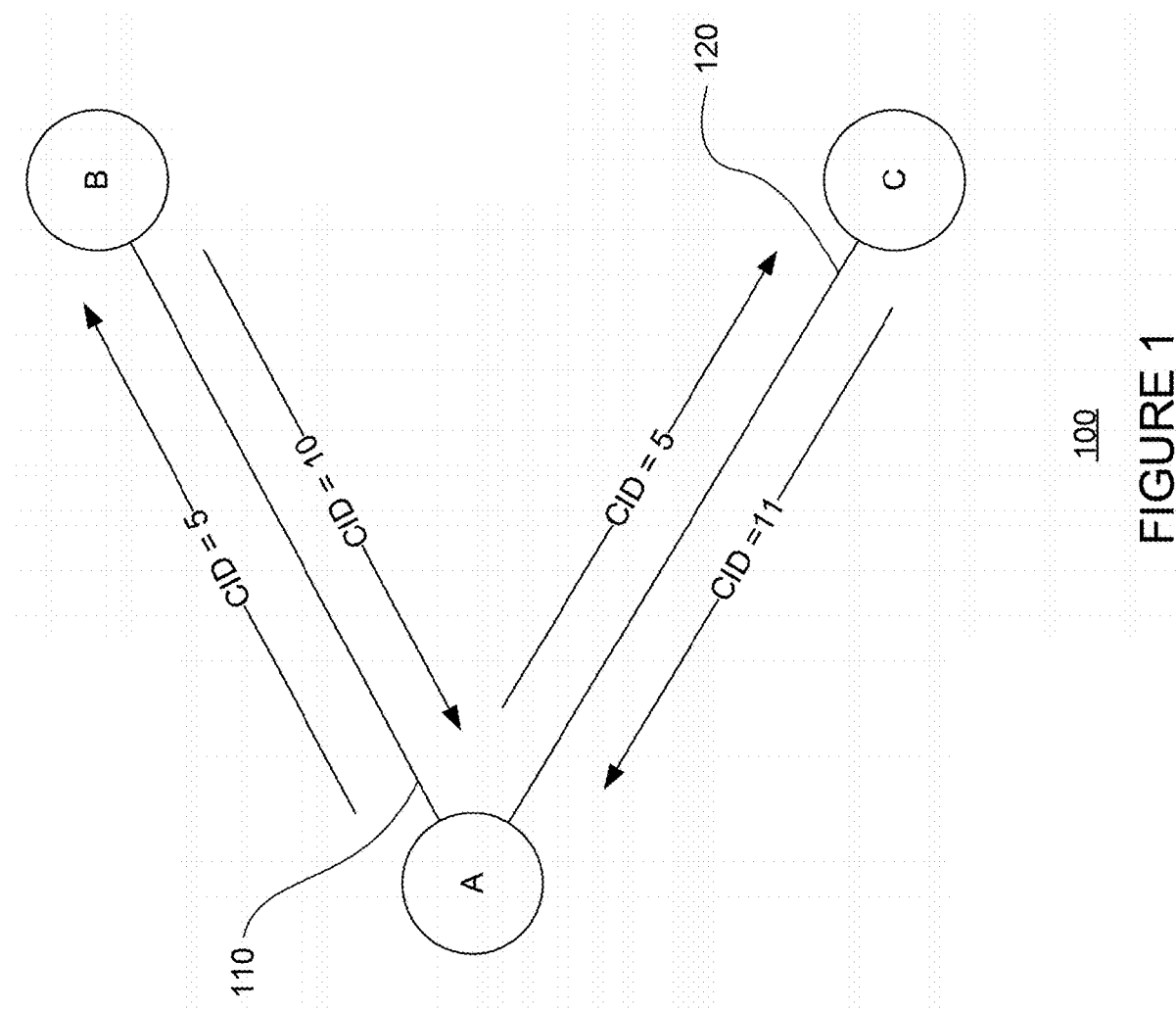
FIG. 1 is a schematic diagram of a network according to aspects of the technology.

FIG. 1 shows an example network 100. The network 100 includes various entities, such as entity A, entity B, and entity C. In order to communicate with one another, connections are formed between the entities, such as connection 110 between entities A and B, and connection 120 between entities A and C. The entities may communicate over the connections using one or more protocols. For example, a reliable transport (RT) protocol is a protocol which notifies the sender whether or not the delivery of data to an intended receiver was successful. A sender and a receiver are considered peers of a communication protocol, thus entities A and B may be reliable transport peers, and entities A and C may be reliable transport peers. A connection over which reliable transport protocol is used is an end-to-end construct that describes a bidirectional communication channel between two reliable transport peers.

A connection may be identified by a pair of Connection IDs ("CIDs"), one in each direction of communication. CIDs may be allocated by a receiver entity during connection setup process and have no global significance outside of the parties involved. Thus, the connection 110 between entities A and B may have a CID with value 5 for the direction from A to B, and a CID with value 10 for the direction from B to A. The connection 120 between entities A and C may have a CID value 5 for the direction from A to C and a CID with value 11 for the direction from C to A. Further, CIDs assigned by an entity or "Source CIDs" of an entity must have different values. Thus in the example shown, the CIDs assigned by entity A or Source CIDs of entity A have different values 10 and 11. In contrast, "Destination CIDs" of an entity are assigned by other entities and may have the same value. Thus, in the example shown, the Destination CIDs of entity A are assigned by entities B and C respectively, which may have the same value 5.

Packets may be transmitted over the connections between the entities. In this regard, a packet is a basic unit of communication across a connection. A packet may have a predetermined size, for example up to a maximum transfer unit ("MTU") in length. A packet may have a header including information about the packet and its transmission, and a payload of data. To ensure reliable transport, a reliable transport packet may include the Destination CID, such as in a header. For example, when entity B receives a packet over the connection 110 with the Destination CID of 5, entity B may identify the packet as coming from entity A, and may then notify A that the packet has been received by sending an acknowledgment over the connection 110 referencing this packet and its CID of 5. The acknowledgment itself may be sent as a packet including the Destination CID of 5.

Figure 2:
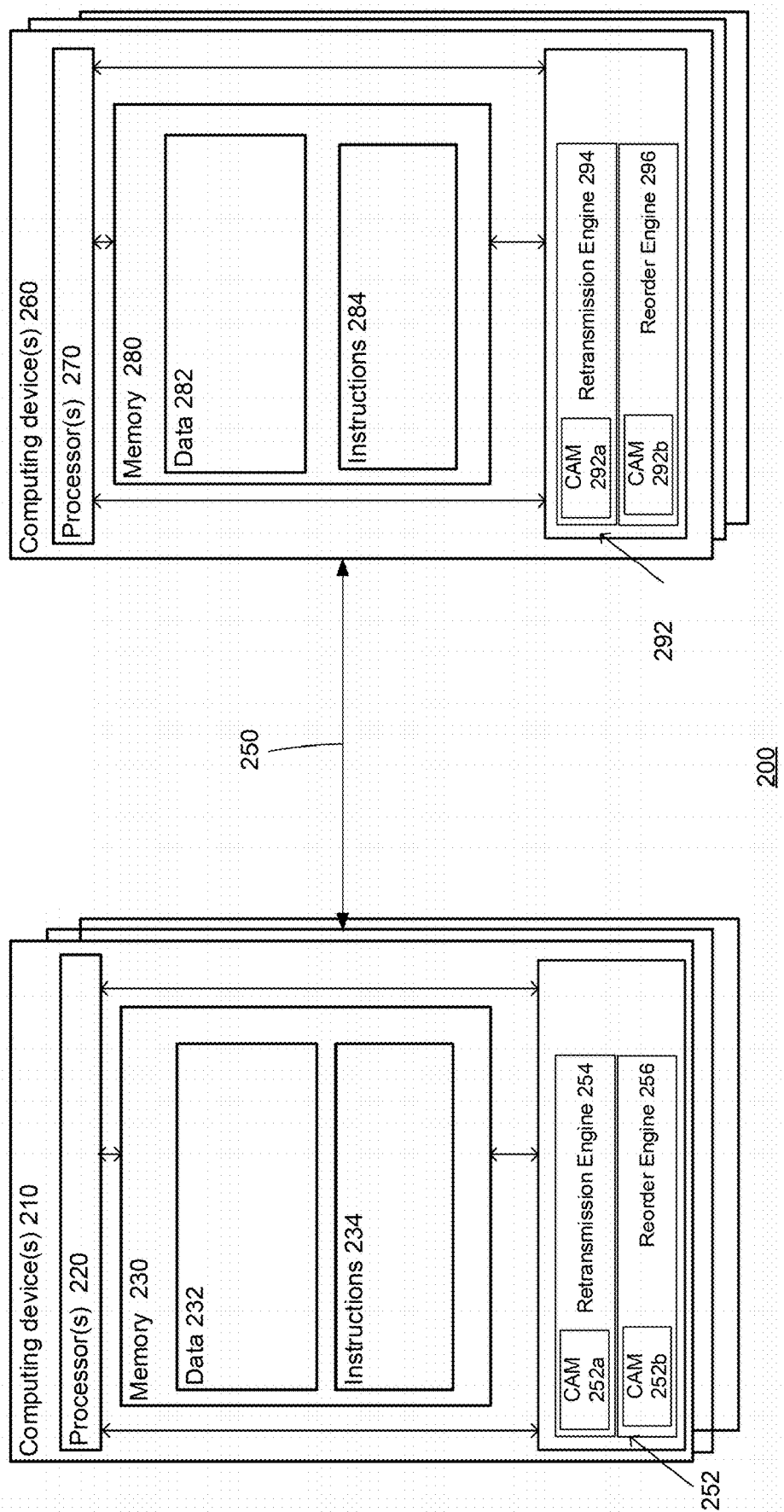
FIG. 2 is a block diagram of an example system according to aspects of the technology.

Entities A, B, and C may be any type of device capable of communicating over a network, such as personal computing devices, sever computing devices, mobile devices, wearable devices, virtual machines, etc. FIG. 2 is a block diagram of some components in an example system 200 that can communicate using a reliable transport protocol. The system 200 includes at least two entities having one or more connections between them. It should not be considered as limiting the scope of the disclosure or usefulness of the features described herein. In this example, the system 200 is shown with two entities, one or more computing devices 210 and one or more computing devices 260, with a connection 250 between them. For example, computing devices 210 may be entity A and computing devices may be entity B of FIG. 1, and connection 250 may be connection 110 of FIG. 1. The computing devices 210 and 260 may be configured with similar components as shown, or may include additional and/or different components. In the example shown, the computing devices 210 contain one or more processors 220 and memory 230.

The one or more processors 220 can be any conventional processors, such as a commercially available CPU. Alternatively, the processors can be dedicated components such as an application specific integrated circuit ("ASIC") or other hardware-based processor. Although not necessary, the one or more of the computing devices 210 may include specialized hardware components to perform specific computing processes.

The memory 230 can be of any non-transitory type capable of storing information accessible by the processor, such as a hard-drive, memory card, ROM, RAM, DVD, CD-ROM, write-capable, and read-only memories. Memory 230 of the computing devices 210 can store information accessible by the one or more processors 220, including data 232 and instructions 234.

Memory 230 can include data 232 that can be retrieved, manipulated or stored by the processors 220. For example, data such as communication protocols, connection information such as CIDs, definitions of headers, etc., as described with respect to FIG. 1 and FIGS. 3-12 may be retrieved, manipulated, or stored by the processors 220.

Memory 230 of the computing devices 210 can also store instructions 234 that can be executed by the one or more processors 220. For instance, instructions such as communication protocols as described with reference to FIGS. 1 and 3-12, and flow diagram of FIG. 13 may be performed by the one or more processors 220 according to instructions 234 and data 232 in memory 230.

Data 232 may be retrieved, stored, or modified by the one or more processors 220 in accordance with the instructions 234. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The instructions 234 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance.

A content addressable memory (CAM) 252, 292 (shown as 252a, 252b, 292a, 292b) may be installed in one or both of the computing devices 210, 260. The content addressable memory 252, 292 may provide a look-up table that allows the processors 220, 270 to mark, order, classify, and identify the packets and data transmitted between the computing devices 210, 260 and store such information in the look-up table configured in the content addressable memory 252, 292. A retransmission engine 254, 294 and a reorder engine 256, 296 utilize the content addressable memory (CAM) 252, 292 to perform the look-up operation or retransmission operation so as to assist reordering and/or retransmitting packets or data when data or packets are lost, out-of-order or missing during transmission. Based on the look-up table registered in the content addressable memory (CAM) 252, 292, data sequencing and transmission content may be easily stored and compared. Thus, when the packets is lost or out of order during transmission that requires reassemble, reorder, or retransmit, the content addressable memory (CAM) 252, 292 may assist identifying the missing or out-of-order information to request for data retransmission or data reordering.

Although not shown, computing devices 210 may further include other components typically present in general purpose computing devices. For example, computing devices 210 may include output devices, such as displays (e.g., a monitor having a screen, a touch-screen, a projector, a television, or other device that is operable to display information), speakers, haptics, etc. The computing devices 210 may also include user input devices, such as a mouse, keyboard, touch-screen, microphones, sensors, etc.

Although FIG. 2 functionally illustrates the processor, memory, and other elements of computing devices 210 as being within the same block, the processor, computer computing device, or memory can actually comprise multiple processors, computers, computing devices, or memories that may or may not be stored within the same physical housing. For example, the memory can be a hard drive or other storage media located in housings different from that of the computing devices 210. Accordingly, references to a processor, computer, computing device, or memory will be understood to include references to a collection of processors, computers, computing devices, or memories that may or may not operate in parallel. For example, the computing devices 210 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over a network.

The computing devices 210 may be capable of directly and indirectly communicating with other entities, such as computing devices 260, of a network through connection 250.

Computing devices 210 and 260 may be interconnected using various protocols and systems, such that computing devices in the network can be part of the Internet, World Wide Web, specific intranets, wide area networks, or local networks. Computing devices in the network can utilize standard communication protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

Figure 3:
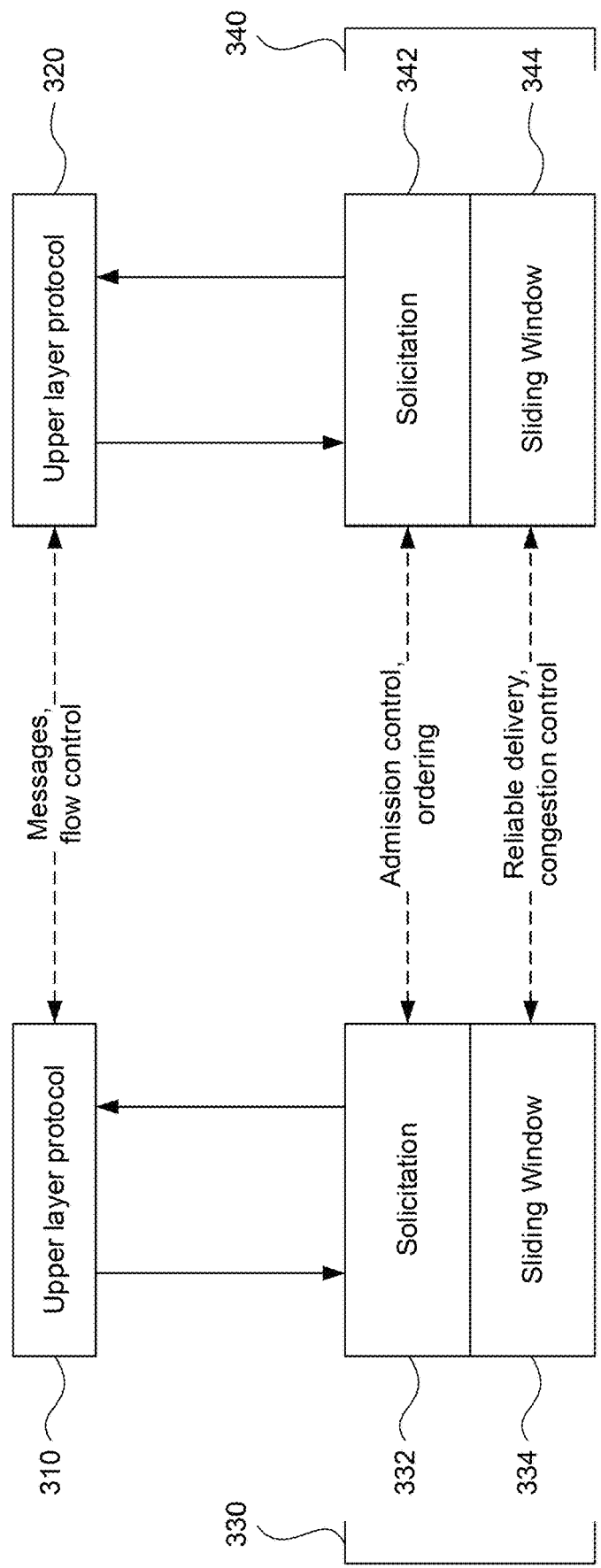
FIG. 3 is a block diagram of communication layers according to aspects of the technology.

Returning to FIG. 1, packets may be transmitted between the entities A, B, and/or C over the connections using one or more communication protocols. FIG. 3 shows an example communication protocol system 300. The communication protocol system 300 may be implemented on two or more entities in a network, such as two or more of entities A, B, C of network 100 of FIG. 1, for example by processors 220 and 270 of FIG. 2. As shown, each entity may include multiple layers of communication protocols. For example, entity A may include upper layer protocol ("ULP") 310 and reliable transport ("RT") protocol 330, and entity B may include upper layer protocol 320 and reliable transport protocol layer 340. Peers may be formed between protocols of each layer. Thus, ULP 310 and ULP 320 are ULP peers, and reliable transport protocol layer 330 and reliable transport protocol layer 340 are RT peers. Further as shown, within each entity, the upper layer protocols are configured to communicate with the reliable transport protocols.

As described with reference to FIGS. 4-12, the upper layer protocols 310, 320 may be responsible for implementing the hardware/software interface, processing of messages, completion notifications, and/or end-to-end flow control. The upper layer protocols may be implemented on any of a number of hardware or software devices. For example, the upper layer protocols may be implemented as Remote Direct Memory Access ("RDMA") operation. As another example, the upper layer protocols may be implemented as a Non-Volatile Memory Express ("NVMe").

Also described with reference to FIGS. 4-12, the reliable transport protocols 330, 340 may be responsible for reliable delivery of packets, congestion control, admission control, and/or ordered or unordered delivery of packets. Each reliable transport protocols 330, 340 may logically be partitioned into two sublayers of protocols. Thus as shown, reliable transport protocol layer 330 is partitioned into a solicitation sublayer 332 that is responsible for end-point admission control and optionally ordered delivery of packets, and a sliding window sublayer 334 that is responsible for end-to-end reliable delivery and congestion control. Likewise, reliable transport protocol layer 340 is also divided into a solicitation sublayer 342 and a sliding window sublayer 344.

Figure 4:
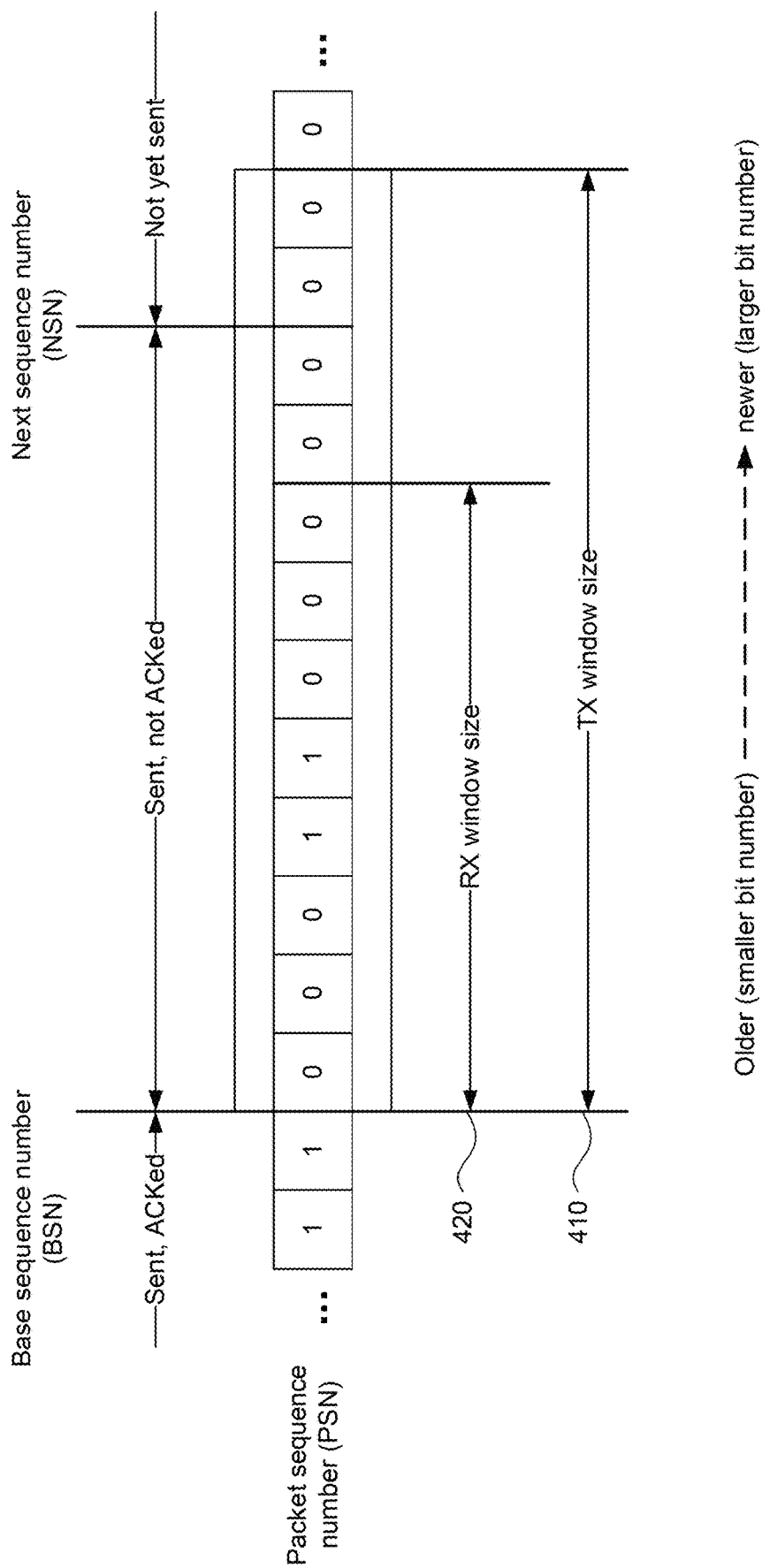
FIG. 4 illustrates an example sliding window according to aspects of the technology.

FIG. 4 shows example sliding windows 410 and 420. The sliding windows 410 and 420 are used by entities to keep track of a predetermined number of packets to be transmitted and acknowledged over a connection. For example, entity A may use the TX sliding window 410 for keeping track of packets sent to the entity B over the connection 110. Entity B may use use the RX sliding window 420 for keeping track of packets received from the entity B. In some examples, delays may occur between the TX sliding window 410 and RX sliding window 420 due to network latency. As a result, the TX sliding window 410 and RX sliding 420 window nay go out-of-sync temporarily as the network out-of-order and/or loss. As such, the sliding windows 410 and 420 may be respectively implemented in the sliding window sublayer 334 that is part of the reliable transport protocol layer 330 of FIG. 3. The TX sliding window and the RX sliding window may have different sizes as shown, or may alternatively have the same size.

Referring to the TX sliding window 410, to keep track of the packets, each packet is assigned a Packet Sequence Number ("PSN") by the sender entity A. As shown, the bit number increases from left to right. The receiver entity B may acknowledge the packets it has received within the sliding window by communicating to the sender entity A the PSN it has received within the window in an acknowledgement packet. In this regard, a Sequence Number Bitmap (SNB) may be provided on both the sender entity A and the receiver entity B. Each bit of the Sequence Number Bitmap (SNB) represents one packet within a sliding window at the entity. For example, for the TX sliding window 410, a bit is set to 1 if a sent packet has been acknowledged. Otherwise the bit is 0. Once all packets within the TX sliding window 410 are received and acknowledged, the sender entity A may move the sliding window 410 forward to the next set of packets to be transmitted. The sliding window moves forward once the base sequence number (BSN) packet is acknowledged. Thus, referring to the example in FIG. 4, the sliding window moves by one once the left most 0 is marked, and moves by another one once the second-left-most 0 is marked, and by three once the third 0 is marked (since the two following bits are already set).

PSN for the sender entity may include Base Sequence Number ("BSN") and Next Sequence Number ("NSN"). As shown, BSN is the PSN value of the oldest packet that is yet to be acknowledged by the receiver entity B. Further as shown, NSN is the PSN value that should be assigned to the next packet transmitted over the connection to receiver entity B. For instance, when a packet is received from ULP 310 for transmission, the current PSN may be updated to NSN. Then when the packet is transmitted over the connection, NSN may be incremented, for example with NSN=(NSN+1) mod $2^{32}$. As such, within the sliding window 410, Bit 0 represents a PSN value of BSN and Bit n represents a PSN value of (BSN+n).

Although not shown, the receiver entity may also keep one or more sliding windows. For example, a RX sliding window may be kept by receiver entity B for the packets received, where each bit represents a packet to be received with the sliding window. The bit is set to 1 if the packet has been received by the receiver entity B. Otherwise the bit is 0. The receiver entity B may also use PSN to keep track of received packets. For instance, BSN may be the PSN value of the oldest packet that is yet to be received by the receiver entity. When a packet is received with a PSN value of BSN, the BSN may be updated to the next lowest PSN of the packet that has not yet been received, for example with BSN=(BSN+1) mod $2^{32}$. The update of the BSN may clear the bits in the Sequence Number Bitmap corresponding to packets from the previous BSN to the PSN. As such, within the RX sliding window for the receiver entity B, Bit 0 represents a PSN value of BSN and Bit n represents a PSN value of (BSN+n). Because sender entity A does not acknowledge the acknowledgements sent by receiver entity B, that is, PSN is not used for the acknowledgment packets, the receiver entity B need not keep a TX sliding window for the acknowledgements it sends.

The sender entity and receiver entity may handle the packets and the respective acknowledgements according to a set of rules. For instance, if the receiver BSN in a received packet is smaller than the sender entity's BSN, the sender entity discards the ACK information; otherwise, the sender entity updates its BSN to match the receiver entity's BSN. After adjusting its BSN, the sender entity applies an OR operation on the receiver entity's Sequence Number Bitmap in the ACK packet with its own Sequence Number Bitmap. After a packet is transmitted, it is buffered by the sender entity until it is acknowledged by the receiver entity. With respect to retransmission of failed packets, the sender entity may be configured to free up resources allocated to all ACK packets in a retransmit buffer. Further, upon per packet retransmit timer expiry, the sender entity retransmits the packet with the same PSN as the original packet and increment a retransmission counter for that packet.

The receiver entity may also implement a number of rules. For instance, if the PSN value of the received packet is less than the BSN of the received packet, the receiver entity discards the packet and sends an ACK packet with the current BSN. If the PSN value falls within the receiver entity's sliding window, the receiver entity updates the Sequence Number Bitmap by setting the bit at location (PSN-BSN) to 1. If the bit at location (PSN-BSN) was already 1, the packet is discarded; otherwise the packet is delivered to the ULP of the receiver entity and a cumulative ACK counter is incremented. If the PSN of the received packet is equal to BSN of the received packet, the receiver entity updates the BSN to be equal to the next highest PSN that has not been received.

Note that, because the packets are tracked according to bitmaps, the sliding windows are configured to allow the entities to keep track of packets received and/or acknowledged out-of-order within the respective sliding window. Thus as shown, although packets represented by bits 3 and 4 may be sent by entity A before the packets represented by bits 0, 1, and 2, the packets represented by bits 3 and 4 may be received and/or acknowledged before the packets represented by bits 0, 1, 2 in the TX sliding window 410.

Network congestion may be detected by monitoring packet retransmission and/or packet round-trip latencies. To perform congestion control, a size of the one or more sliding windows may be adjusted. For example, if congestion is high, it may take longer for all packets within the TX sliding window 410 to be received and/or acknowledged by entity B. As such, to reduce congestion, the number of outstanding packets in the network may be reduced by decreasing the size of the sliding window 410. In addition to or as alternative to changing the size of the sliding window, retransmission timer expiry value in response to network congestion status may be adjusted. For example, retransmitting less frequently might reduce network congestion.

Figure 5:
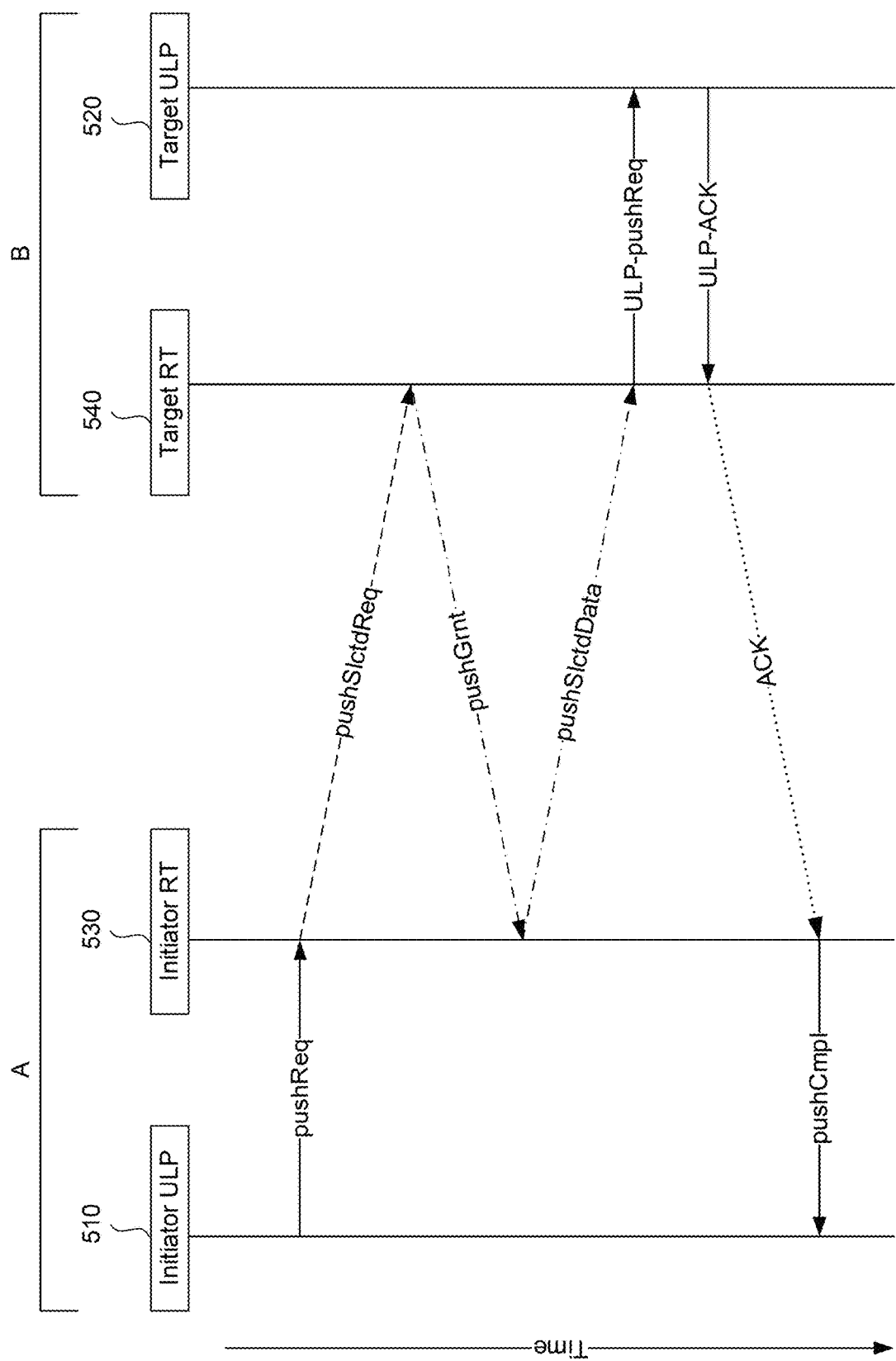
FIG. 5 is an example timing diagram of solicited push transaction according to aspects of the technology.

The communication protocol system 300 of FIG. 3 may support various transactions, including both pull and push transactions. The communication protocol system 300 of FIG. 3 may be configured to perform the transactions using an initiator-target approach, where an "initiator" is the entity that requests a transaction, and a "target" is the entity that responds to the request. Such a transaction may involve multiple packets to be transmitted between the initiator and target entities, thus the initiator and the target entities may be both sender and receiver of packets in the transaction, and may keep track of packets and/or acknowledgements using TX and/or RX sliding windows as described with reference to FIG. 4. FIG. 5 shows an example timing diagram for a push transaction according to aspects of the technology. It is noted that pull transaction may be similarly constructed without the push grant (PushGrnt) feedback. The push transaction depicted in FIG. 5 is a solicitated push request. Other types of the push transaction, such as unsolicited push request, may be similarly constructed without the push grant (PushGrnt) feedback as needed. The example timing diagrams of FIG. 5 may be implemented by two entities in a network, such as entities A and B over connection 110 of FIG. 1, for example by processors 220 and 270 of FIG. 2.

FIG. 5 shows a timing diagram 500 for a push request, such as a solicited push transaction. As shown, the push transaction is performed by various communication protocol layers of both the initiator entity and the target entity. For example, entity A may be the initiator entity and initiator ULP 510 and initiator RT 530 may be communication protocol layers configured as upper layer protocol 310 and reliable transport protocol layer 330 of FIG. 3, while entity B may be the target entity and target ULP 520 and target RT 540 may be communication protocol layers configured as upper layer 320 and reliable transport protocol layer 340 of FIG. 3.

As depicted in FIG. 5, a push request ("pushReq") may originate from the initiator entity A at the initiator ULP 510, which may be sent to the initiator RT 530. At this stage, the initiator RT 530 only sends a request to the target entity B, for instance over the connection 110, which may or may not be granted by the target entity B. This request and grant process or "solicitation" process may be performed by the respective RTs, which for example may be performed by their respective solicitation sublayers. Thus, the initiator RT 530 is shown sending a push request ("pushSlctdReq") to the target RT 540, and the target RT 540 may decide whether and/or when to grant the pushSlctdReq. In some examples, entity B may limit the total number of outstanding granted pushSlctdData to prevent incast to entity B that causes congestion in the network. If and when the target RT 540 grants the request, the target RT 540 may send a push grant ("pushGrnt") back to the initiator RT 530. Once the initiator RT 530 receives the pushGrnt, the initiator entity A may then push solicited data ("pushSlctdData") onto the target entity B, for instance over the connection 110. This may be performed by the respective RTs, thus the initiator RT 530 is shown pushing solicited data ("pushslctdData") to the target RT 540. The data here is effectively solicited by the pushGrnt from the target RT 540. Once the data is received by the target entity B, the target RT 540 may request for the received data to be placed or stored at the target entity B, and does so by sending a pushReq to the target ULP 520. In response, the target ULP 520 may place or store the received data, and then sends an acknowledgment message ("ULP-ACK") to the target RT 540 acknowledging that the received data has been placed or stored according to the pushReq. For reliable transport, the target entity B sends an acknowledgment message ("ACK") to notify initiator entity A of the receipt and placement of the pushed data, for instance over the connection 110. This is performed by the respective RTs, thus as shown the target RT 540 sends the ACK message to the initiator RT 530. Once the ACK message is received by the initiator RT 530, the initiator RT 530 may send a push complete message ("pushCmpl") to initiator ULP 510 to notify that the data packet has been received and placed by the target entity.

As described with reference to FIG. 1, the initiator entity A and the target entity B may communicate with each other by transmitting packets. Thus, the pushSlctdReq, pushGrnt, pushslctdData and ACK may each be a packet transmitted over the connection 110. Further as described with reference to FIG. 4, reliable transport packets may be tracked by sliding windows. As such, the pushslctdData packet may be part of a data TX sliding window kept by entity A (indicated by dash dot line). The pushGrnt packet may be part of a data TX sliding window kept by entity B (indicated by dash dot line), and the pushSlctdData packet may be part of a data TX sliding window kept by entity A (indicated by dash dot line). For reliable transport, the ACK packet sent by entity B may reference the PSN of the pushSlctdData, which entity A may keep track of using the data TX sliding window. Likewise, though not shown, entity A may send ACK for the pushGrnt packet, which entity B may keep track of using its data TX sliding window, and entity B may send ACK for the pushSlctdReq, which entity A may keep track of using its request TX sliding window. However, acknowledgment messages such as the ACK packet shown (indicated by dot line) are not reliable transport packets, and thus may not be part of any sliding window at the sender entity B.

As illustrated by FIG. 5, the solicited push transaction allows an initiator entity to solicit a grant to send data from a target entity before actually sending the data. As such, the target entity may have control over the incoming data, which may be especially helpful when multiple initiator entities are attempting to push data onto the target entity, and also if the pushed data is large or if the network is congested. Since incast congestion may be caused by packets not being delivered to the receiver as fast as transmitted, and/or by multiple entities attempting to send packets simultaneously to the same entity, such a solicitation process may reduce incast congestion.

Figure 6:
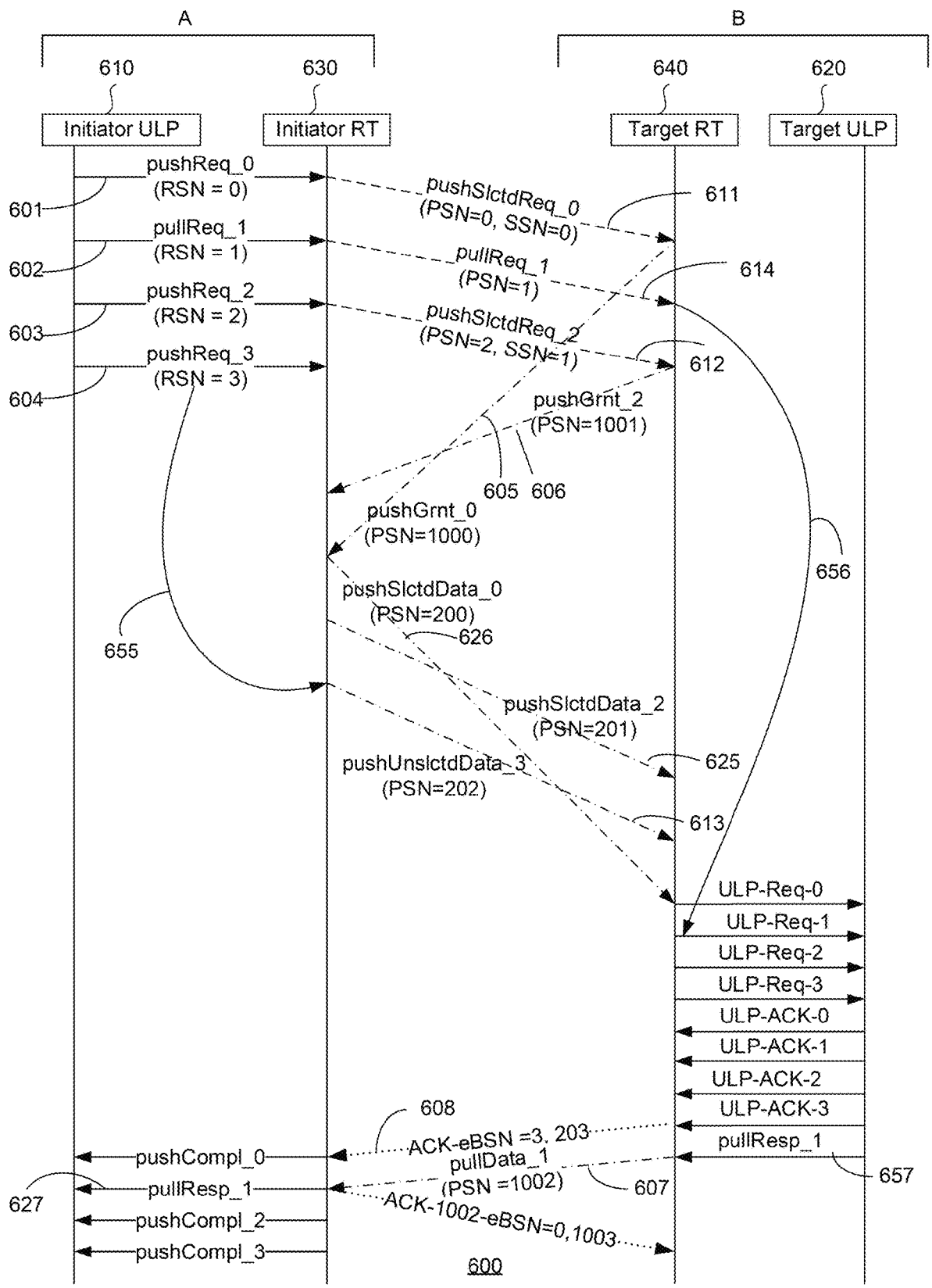
FIG. 6 is an example timing diagram of transactions according to aspects of the technology.

It is noted that other types of the requests, such as an unsolicited push request and/or pull request may also be utilized in the communication protocol system, as shown in FIG. 6, with different feedback mechanisms. For example, an unsolicited push request does not require a pushGrnt from the target entity to send the push unsolicited data. Similarly, a pull request does not need a pull grant from target RT. Instead, the target RT may then send the pull request to the target ULP to request permission. The target ULP may then send an acknowledgment message ("ULP-ACK") to the target RT acknowledging the pull request, as well as a pull response ("pullResp") instructing the target RT to pull the requested data. In response to the pull request, the target RT may pull the requested data ("pullData"), and send the pulled data to the initiator RT, for instance over the connection 110. Once the requested data is received by the initiator RT, the initiator RT may send a pullResp to the initiator ULP so that the initiator ULP may place or store the received data packet.

Thus, the communication protocol system may be configured to perform both of the solicited push transactions and/or the unsolicited push transactions. Where the communication protocol system is configured to perform both of the push transactions, the system may be configured to determine which push transaction to use based on one or more factors. For instance, whether a push request should be sent as a solicited or unsolicited request may be determined by the initiator RT. The initiator RT may determine whether to send a solicited push request or an unsolicited push based on a length of the push request from the initiator ULP. As an example, if a push request requires a large amount of data to be pushed, such as meeting a predetermined size threshold, a solicited push request may be used to make sure that the large request does not cause congestion; otherwise an unsolicited push may be used. As another example, whether to use solicited request or unsolicited push may be based on network conditions, such as level of congestion, where a solicited request may be used when congestion meets a predetermined threshold level.

FIG. 6 shows an example timing diagram for ordered transactions over a connection according to aspects of the technology. The example timing diagrams of FIG. 6 may be implemented by two entities in a network, such as entities A and B over connection 110 of FIG. 1, for example by processors 220 and 270 of FIG. 2.

As depicted in FIG. 6, various transactions, such as the pull and push transactions, may be performed by various communication protocol layers of both the initiator entity and the target entity. For example, entity A may be the initiator entity and initiator ULP 610 and initiator RT 630 may be communication protocol layers configured as upper layer protocol 610 and reliable transport protocol layer 630 of FIG. 6, while entity B may be the target entity and target ULP 620 and target RT 640 may be communication protocol layers configured as upper layer protocol 620 and reliable transport protocol layer 640 of FIG. 6.

Referring to the timing diagram 600, a number of requests may originate from the initiator entity A, including pull requests such as pullReq_1, shown as communication path 602, and push requests such as pushReq_0, pushReq_2, and pushReq_3, shown as communication paths 601, 603, 604. As described above, these requests may be sent by the initiator ULP 610 to the initiator RT 630. Once the initiator RT 630 receives these requests, initiator RT 630 may optionally determine whether the push requests should be sent as solicited or unsolicited. Thus, in this example, the initiator RT 630 may determine that pushReq_0 and pushReq_2 are to be sent as solicited, while pushReq_3 is to be sent as unsolicited. The initiator RT 630 may then send these pull and push requests to the target RT 640, for example over the connection 110.

The requests may be sent by the initiator ULP 610 in a particular order as indicated by the Request Sequence Numbers ("RSN"), which may be assigned by the initiator RT 630, so as to track the transaction orders. In some instances, the initiator RT 630 may also assign Solicited Sequence Numbers ("SSN") specifically to solicited push requests, which may be an incremental number as shown. When the requests are sent as packets between two entities, the requests may be assigned with a sequence of numbers in ascending order according to the order of the RSN. Thus, as shown, the requests may be assigned PSNs within one or more TX sliding windows maintained by initiator entity A according to the RSNs. For example, pushSlctdReq_0, shown as a communication path 611, is assigned PSN=0, pullReq_1, shown as a communication path 614, is assigned PSN=1, pushSlctdReq_2, shown as a communication path 612, is assigned PSN=2 within a request TX sliding window of entity A (indicated by dash lines pointing towards B). Note that since pushReq_3 from the initiator ULP 610 does not require solicitation, there is no corresponding pushUnslctdReq being sent between the RTs. While RSNs and SSNs may be known to the ULPs, the PSNs may be unknown to the ULPs but only used by the RTs in packets.

In response to the solicited push requests, push grants may be sent by the target RT 640 to the initiator RT 630 in the order of the received requests, such as pushGnt_0 and pushGnt_2, shown as communication paths 605, 606 respectively. The push grants may be assigned with PSNs in ascending order within one or more TX sliding windows maintained by the target entity B according to the same order as the RSNs of the push requests. For example, pushGrnt_0 is assigned PSN=1000 and pushGrnt_2 is assigned PSN=1001 within a data TX sliding window of entity B (indicated by dash dot lines pointing towards A). However, the push grants may not be received in the same order by the initiator RT 630 as the order of transmission for the push requests. Thus, as shown, pushGrnt_2 is received by the initiator RT 630 before the pushGrnt_0. In this regard, the reorder engine 256, 296 may assist resembling the order of the requests prior to sending to ULPs. Details of the reordering operations and the retransmission operations will be described below with reference to FIGS. 7-14.

Nonetheless, the initiator RT 630 may determine the correct order of the push grants based on their respective RSNs and push the data packets based on that order. Such order may be determined by performing a look-up operation in the reorder engine to determine the correct order. As such, although pushGrnt_2 was received by the initiator RT 630 before pushGrnt_0, the initiator RT 630 may first push the data solicited by pushGrnt_0 with pushSlctdData_0 and then push the data solicited by pushGrnt_2 with pushSlctdData_2 to target RT 640. The pushed data packets are also assigned PSNs in ascending order within one or more TX sliding windows maintained by initiator entity A according to the order of transmission. For example, pushSlctdData_0 is assigned PSN=200 and pushSlctdData_2 is assigned PSN=201 within a data TX sliding window of entity A (indicated by dash dot lines pointing towards B shown as the communication paths 626, 625 respectively). Note that the pushReq_3 does not require a grant, thus as indicated by the curved arrow 655 skips directly to pushUnslctdData_3, shown as the communication path 613, which pushes the unsolicited data. In this example, pushUnslctdData_3 is assigned PSN=202 also in the data TX sliding window of entity A.

Target RT 640 receives the requests, and then sends corresponding requests to the target ULP 620 in the order of ULP-Req-0-1-2-3, which is in the same order as the transmission order of the requests from the initiator ULP 610 shown at the top of the timing diagram 800. These ULP-Reqs ask the target ULP 620 for permission to pull data, or to place the pushed data at the target entity B. Note that the pull request pullReq_1 does not require a grant as described, thus as indicated by the curved arrow 656 skips directly to the ULP-Req. In response to the ULP-Reqs, the target ULP 620 may send acknowledgement ULP-ACKs to the target RT 640. In this ordered system, the ULP-ACKs are sent in the order of ULP-ACK-0-1-2-3, which is the same as the order of transmission for the requests from the initiator ULP 610.

Following the ULP-ACKs, with respect to the push transactions, ACKs acknowledging the data packets (or data acknowledgments) are then sent by target RT 640 to initiator RT 630 to notify the safe receipt and placement of the reliable transport data packets. As an example, ACK-eBSN=3, 203, shown as the communication path 608, is sent by entity B to notify entity A that all request packets up to PSN=3 and all data packets up to PSN=203 have been received and placed. Once the ACK is received, initiator RT 630 may send a completion message pushCompl_0 to initiator ULP 610. Further, in some instances acknowledgment packets may be opportunistically piggybacked on other reliable transport packets. For example, the requests push-SlctdReq_0, pullReq_1, and pushSlctdReq_2, are reliable transport packets requiring an ACK, but these acknowledgments to requests (or request ACKs) are not explicitly shown in timing diagram 800 because they may be piggybacked on reliable transport packets such as pushGrnt_0 and push-Grnt_2.

Also following the ULP-ACKs, pull requests may also be responded to. Thus, as shown, the target ULP 620 may send a pullResp_1 instructing target RT 640 to pull the requested data. Target RT 640 then sends the pulled data to the initiator RT 630 with pullData_1. In this example, pullData_1 is assigned PSN=1002 within the same data TX sliding window of entity B as the pushGrnts (indicated by dash dot line pointing towards A). The initiator RT 630 then sends a pullResp_1, shown as the communication path 657, to the initiator ULP 610 so that the initiator ULP 610 may place or store the received data packet at entity A. After the data packet is placed or stored at entity A, an acknowledgment may be sent to notify entity B of safe receipt. Thus, as shown, ACK-1002-eBSN=0, 1003 is sent by entity A to notify entity B that the pullData_1 packet has been safely received.

In this ordered system, the completion messages received by the initiator ULP 610 near the bottom of timing diagram 600 are in the same order as the requests that were sent by initiator ULP 610 near the top of the timing diagram 600. This order is maintained on ULPs of both initiator and target entities, where the target RT presents requests to the target ULP in the same order as the initiator ULP sends requests to the initiator RT. This ordered system ensures that the requests are delivered once and only once over the connection. In contrast, there may not be ordering requirement between transactions going in different directions over the connection.

However, in some situations wherein the requests transmitted between the initiator RT and the target RT may be out of order due to different path or other factors such as unexpected delay or equipment failure, the requests may arrive at the target RT out of sequence or out of order, or the request may be dropped or corrupted. This may become problematic when the target RT is configured to receive the requests the same order as transmitted from the initiator RT. In some examples, the target ULP is required to receive the requests from the target RT the same order as the initiator ULP to initiator RT. In this regard, out-of-order data or data loss may undesirably cause communication or transmission failure.

Figure 7:
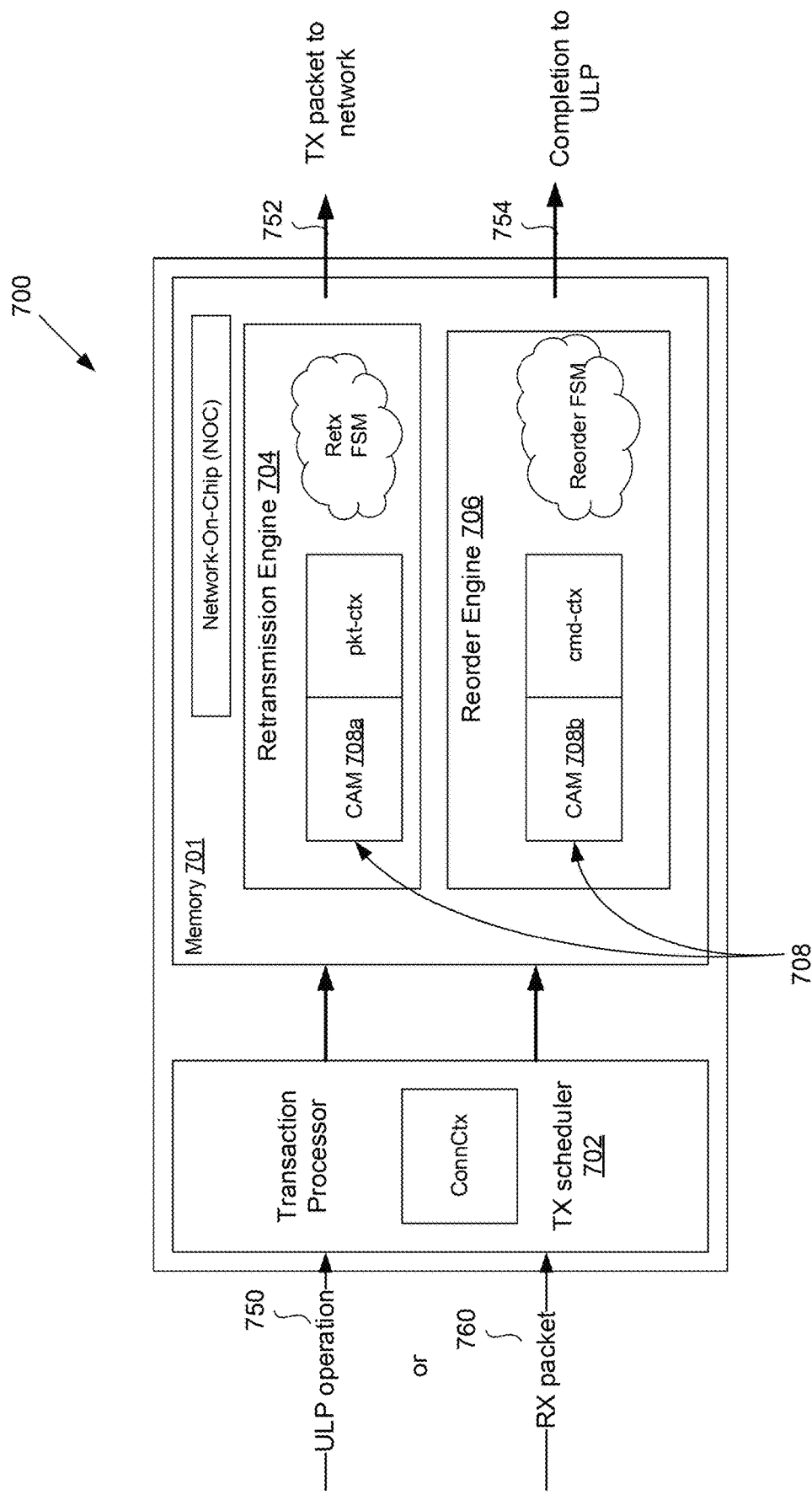
FIG. 7 is a block diagram of an example hardware architecture including a reorder engine and a retransmission engine according to aspects of the technology.

FIG. 7 depicts a CAM-based hardware architecture 700 that utilizes a content addressable memory (CAM) 708 (shown as 708a, 708b) to provide a look-up operation for the data or packets transmitted therethrough. It is noted that the CAM-based hardware architecture 700 may be built in the initiator RT 530, 630 and/or target RT 540, 620 to provide the look-up operation. The CAM-based hardware architecture 700 includes a plurality of CAMs 708 that may provide look-up tables for data comparison during transmission.

In the example wherein the CAM-based hardware architecture 700 is utilized in the initiator RT 530, 630, during transmission, a request, such as a ULP operation shown by the arrow 750, from ULP, such as the initiator ULP 510, 610, may be transmitted through the CAM-based hardware architecture 700 in the initiator RT 530, 630. A transaction processor in the CAM-based hardware architecture 700 may serve as a transmission scheduler (TX scheduler) 702 to process context, requests, data, or packets from the ULP operation 750, generating a command context per transaction to send to a reorder engine 706. The reorder engine 706 includes a content addressable memory (CAM) 708b that may mark, register and store data entries and information from the connection context in the content addressable memory (CAM) 708b. Each connection node maintains a connection context (connCtx) per connection and the connection context may be updated based on transactions so as to keep both bodes synchronized. Each data entry may be assigned with a plurality of sequences numbers, such as solicitation sequence numbers (SSNs) or request sequence numbers (RSNs) in an ascending order. The connection ID and some information of the data entries are then saved in the content addressable memory (CAM) 708b. It is noted that different SSNs or RSNs may be assigned to the data entries, based on the types of the connection context from the ULP operations 750. Thus, the content addressable memory (CAM) 708b in the initiator RT 530, 630 may identify and mark each data entry from the ULP operation 750 to be transmitted therefrom and save these data entries with the assigned numbers in the content addressable memory (CAM) 708b, which may later serve as a look-up table when the data is transmitted back from the target RT 540, 620.

Subsequently, the data entries may then transmit through the retransmission engine 704 so that the content addressable memory (CAM) 708a in the retransmission engine 704 may record and track the outstanding data, including packet sequence number (PSN) assigned from each data entries, in the retransmission engine 704. After the data entries from ULP operation 750 is marked, assigned, registered, tracked and recorded, the data entries may then transmit to network, as shown in the arrow 752, to the target RT 540, 620.

In contrast, when data or packets are transmitted back from the target RT 540, 620 and received by the initiator RT 530, 630, as shown from by the arrow 760, similarly, the data may be transmitted to the transaction processor, such as the transmission scheduler (TX scheduler) 702, scheduled to be transmitted back to the initiator ULP 510, 610 as the final destination. Similar to the operation described above, the data/packet may then transmit through the reorder engine 706 to perform a look-up operation to ensure that the packets as received are in order. For example, the received data may transmit through the reorder engine 706 and compare the order of the received data with the order of the data entries saved in the content addressable memory (CAM) 708b. When the order of the received data matches the order saved in the content addressable memory (CAM) 708b, the data may then be transmitted to the initiator ULP 510, 610 the same order as requested, as shown by the arrow 754 to complete the data transmission. When the order of the received data match does not match the order saved in the content addressable memory (CAM) 708b, the content addressable memory (CAM) 708b may then provide the associated order information so that the received data may be reordered to match the original order prior to transmitting back to the initiator ULP 510, 610. Furthermore, the received data may also transmit through the retransmission engine 704 to ensure the related requests, feedbacks, acknowledges are received. If not, the retransmission engine 704 may request retransmission of the data to complete the communication transmission.

Similarly, the CAM-based hardware architect 700 may also be built in the target RT 540, 640 so as to reorder the data from the initiator RT 530, 630 prior to sending to the target ULP 520, 620. The data from the target ULP 520, 620 may also go through the CAM-based hardware architect 700 for reordering or retransmission, if necessary, prior to sending to the initiator RT 530, 630.

Figure 8A:
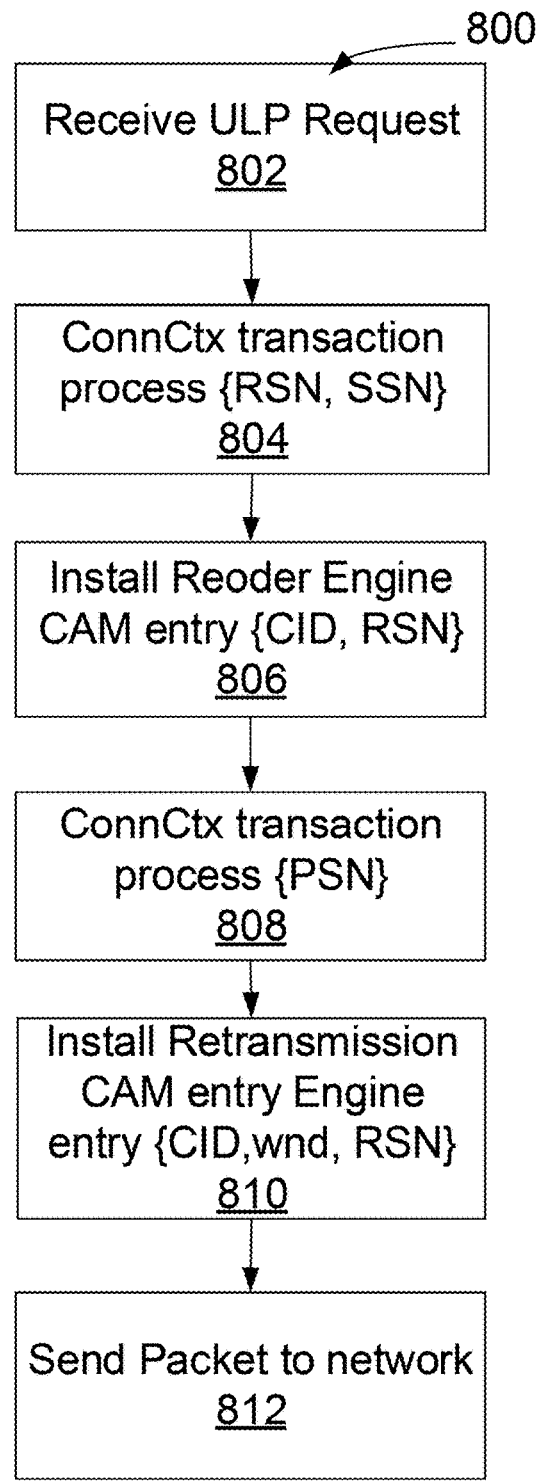
FIG. 8A-8B are example flow diagrams illustrating transmission between ports utilizing the hardware architecture of FIG. 7 according to aspects of the technology.
Figure 8B:
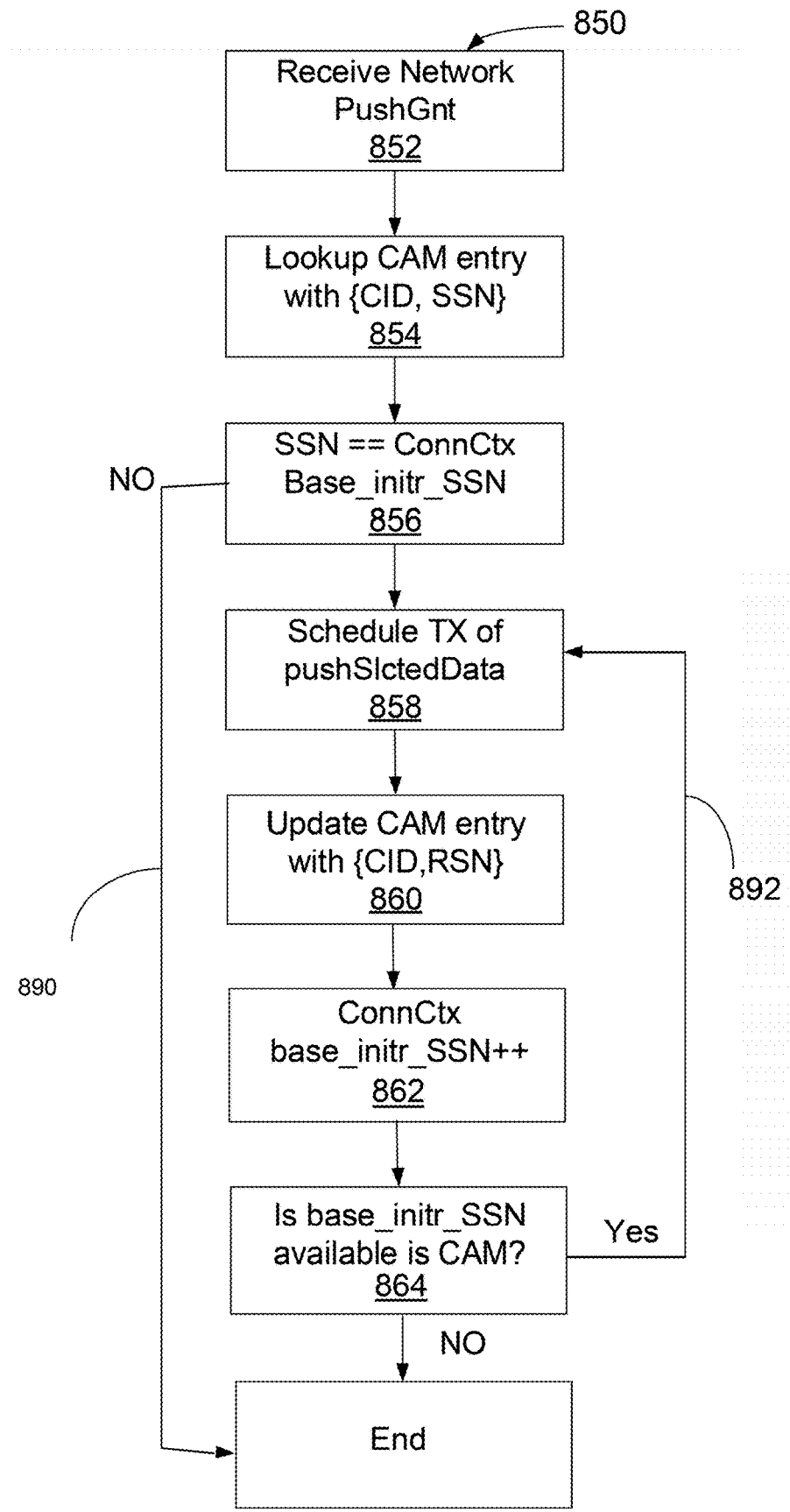

FIG. 8A depicts a flow block diagram illustrating data request transmission process 800 at the initiator RT 530, 630 utilizing the reorder engine 706 and the transmission engine 704 during data transmission. The initiator RT 530, 630 may receive requests both from the initiator ULP 510, 610 and/or from the target RT 540, 640. The example depicted in FIG. 8A illustrates the requests transmitted from the initiator ULP 510, 610 while the example depicted in FIG. 8B illustrates requests transmitted from the target RT 540, 640. Although the examples depicted herein are ordered connections, it is noted that unordered connection may be similarly configured to perform the reorder or retransmission as needed.

In block 802, the initiator RT 530, 630 may receive one or more requests from the initiator ULP 510, 610. The requests, as indicated by the communication paths 601, 602, 603, 604 as depicted in FIG. 6, may include one or more types of requests, such as pull requests, solicited or unsolicited requests and the like.

In block 804, similar to the process flow depicted in FIG. 6, when the requests are received by the initiator RT 530, 630 and processed by the CAM-based hardware architect 700, the transmission scheduler (TX scheduler) 702 may process requests, generating connection contexts (connCtx) that synchronize both communication nodes over multiple sequence numbers over the transmission sliding window and schedule the requests for transmission. The requests with the assigned solicitation sequence number (SSN) or request sequence numbers (RSN) may then be scheduled for transmission. As disclosed above, the request sequence numbers (RSN) may be assigned by the initiator RT 530, 630. In some instances, the initiator RT 530, 630 may assign Solicited Sequence Numbers ("SSN") specifically to solicited push requests, which may be an incremental number. When the requests are sent as packets between two entities, the requests may be assigned with a sequence of numbers in ascending order according to the order of the RSN.

At block 806, the connection contexts (connCtx) with the assigned series of sequence numbers, such as RSN or SSN, may then be transmitted through the reorder engine 706 to mark, register and store these data entries in the CAM 708b. The data saved in the CAM 708b may include some information of the connection contexts (connCtx), such as the information including connection ID (CID), SSN, or RSN, that may help to identify, classify and mark these data entries and store such data entries in the CAM 708b for look-up operations when needed. It is noted that other information, such as packet header or payload content may be saved in another memory, such as a static random access memory (SRAM), that may be able to be in communication with the CAM 708b.

At block 808, the data packet may assign with packet sequences numbers (PSNs) within one or more TX sliding windows maintained. While RSNs and SSNs may be known or unknown to the ULPs, the PSNs may be unknown to the ULPs but only used by the RTs in packets.

At block 810, the data packet is then transmitted through the retransmission engine 704 for marking, registering or storing as well. The retransmission engine 704 may track all active and outstanding packets, by recording the PSNs within one or more TX sliding windows, CID, etc, and save such data/information in the CAM 708a.

At block 812, after the data/packets are registered, marked and stored in the transmission engine 704 and the reorder engine 706 respectively, the data/packets may then be transmitted to the target RT 520, 620.

FIG. 8B depicts a flow block diagram illustrating a data request transmission process 850 at the initiator RT 530, 630 utilizing the reorder engine 706 and the retransmission engine 704 during data transmission. The initiator RT 530, 630 may receive requests both from the initiator ULP 510, 610 and/or from the target RT 540, 640. The example depicted in FIG. 8B illustrates requests transmitted from the target RT 540, 640 in response to the transactions previously transmitted through the initiator RT 530, 630.

In block 852, the initiator RT 530, 630 may receive one or more push grants (PushGnt) from network, such as from the target RT 540, 640. The transmission of the PushGnt is indicated by the communication paths 605, 606 as depicted in FIG. 6. The PushGnts are generated when the incoming requests, such as the push solicited requests, from the initiator RT 530, 630 is received by the target RT 540, 640 and the target RT 540, 640 is then generated the PushGnts back to the initiator RT 530, 630, allowing the initiator RT 530, 630 to subsequently push solicited data to the target RT 540, 640. Thus, when receiving PushGnts from target RT 540, 640, it indicates that the requests, such as the push solicited requests, have been previously sent from the initiator RT 530, 630 and registered in the reorder engine 706 and the retransmission engine 704 of the initiator RT 530, 630.

In block 854, once the initiator RT 530, 630 receives the PushGnts, a look-up operation may be performed to compare the solicited sequence number (SSNs), data information, or data entries of the PushGnts with the data information previously saved in the CAMs 708b in the reorder engine 706.

In block 856, when the data information from the PushGnts matches the data entries saved in the CAMs 708b in the reorder engine 706, such as the data information from PushGnts following the head-of-line requirement based on the transaction orders, the transmission may then move on to block 858 to schedule transmission of the push solicited data (pushSlctedData), as indicated by the communication paths 625, 626 as depicted in FIG. 6, to the target RT 540, 640. In contrast, when the data information from the PushGnts does not match the data entries saved in the CAMs 708a in the retransmission engine 704, which may indicate an transmission error, data out-of-order, data loss or damage, then the transmission process is then aborted and ended, as shown by the loop 890.

At block 860, once the look-up operation is completed in the reorder engine 706 and the push solicited data (pushSlctedData) is scheduled to transmit, the data entries and the RSN and CID assigned for the push request may then be updated in the CAMs 708*b* in the reorder engine 706 and send the push solicited data (pushSlctedData) to the target RT 540, 640.

At block 862, furthermore, the base SSN in the connection context (connCtx) may be incremented and re-lookuped with the CAMs 708*b* to ensure if the transaction has also been granted. If the transaction is granted, the transmission may then move on to block 864 to schedule the transmission, as shown by the loop 892, If not, then transmission is then considered ended.

Figure 9:
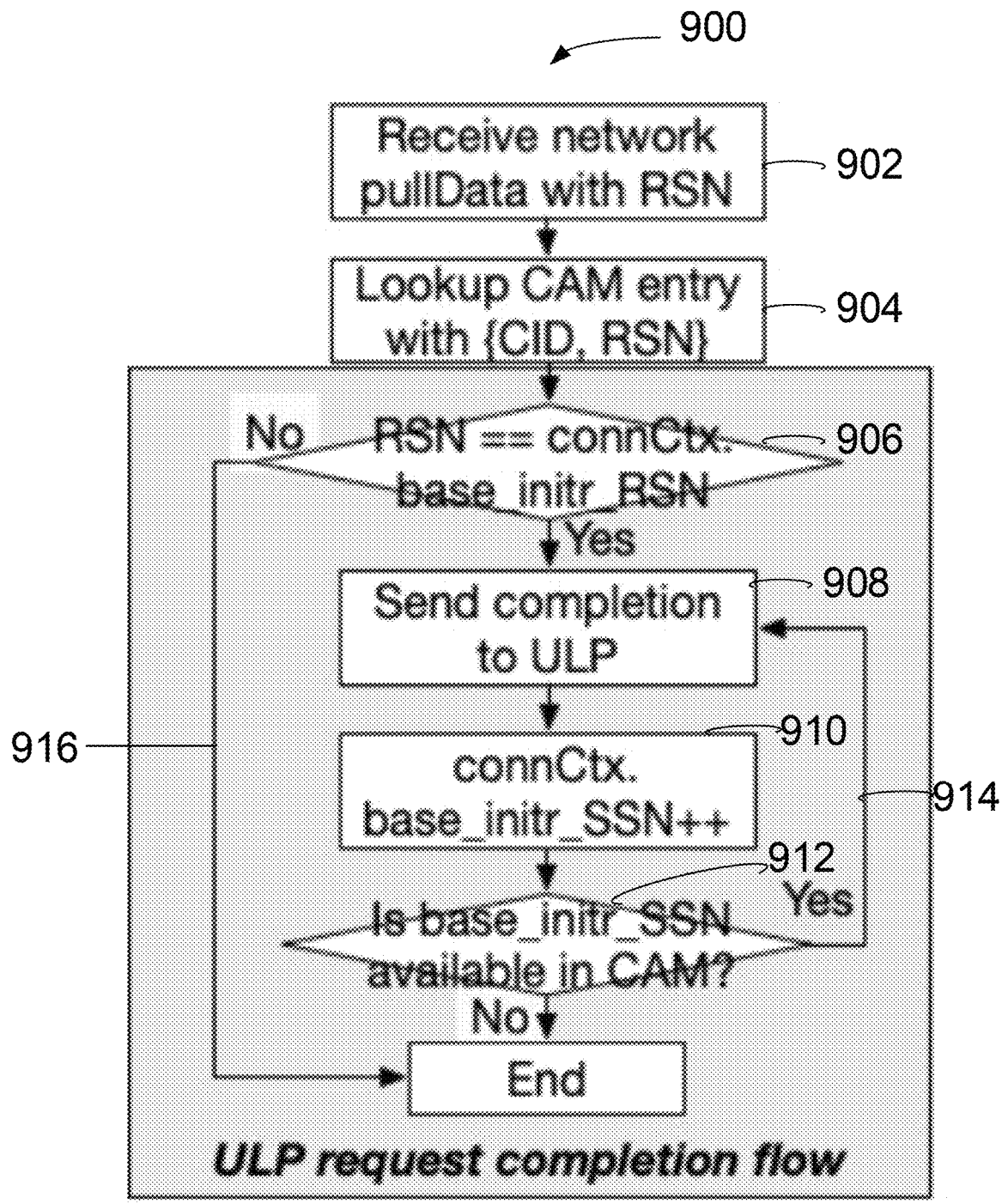
FIGS. 9, 10, 11 and 12 are example flow diagrams illustrating transmission between ports utilizing the hardware architecture of FIG. 7 according to aspects of the technology.

FIG. 9 depicts a flow block diagram illustrating a data request transmission process 900 at the initiator RT 530, 630 utilizing the reorder engine 706 and/or the transmission engine 704 during data transmission. The initiator RT 530, 630 may receive requests both from the initiator ULP 510, 610 and/or from the target RT 540, 640. The example depicted in FIG. 9 illustrates the requests, particularly a pull request, completed in the form of a pull response sent back to initiator ULP 510, 610. For example, a pull Data, such as PullData_1 shown as the communication path 607 in FIG. 6, is transmitted to the initiator RT 530, 630, and the initiator RT 530, 630 is then completed in the form of a pull response, such as pullResp_1 shown in the communication path 627, back to initiator ULP 510, 610, as depicted in FIG. 6, to request the pull data to be saved and placed in the initiator ULP 510, 610.

The data request transmission process 900 starts in block 902 by receiving a pull data with an assigned RSN and/or PSN from the target RT 540, 640, as indicated by the communication path 607 depicted in FIG. 6.

In block 904, a look-up operation is performed to review if the pull_Data as received matches the data entries saved in the look-up table of CAMs 708*b* in the reorder engine 706. As the transmission of the pull_Data is generated when the incoming requests, such as the pull request of PullReq_1, as indicated by communication path 614 in FIG. 6, from the initiator RT 530, 630 is transmitted and received by the target RT 540, 640. Thus, after the PullReq_1 is received, the target RT 540, 640 is then generated the request of pull_Data, allowing the data from the target RT 540, 640 to be pulled by the initiator RT 530, 630. Thus, in the previous transmissions illustrated in FIG. 8A, the data entries associated with the pull request has already been marked and registered in the CAMs 708*b* in the reorder engine 706. Thus, when the pull_Data is transmitted back to the initiator RT 530, 630, the data information associated with the pull_Data is reviewed, compared, and investigated.

In block 906, the data information and/or connection context (ConnCtx) of the pull_Data is compared and mapped. When the RSN of the pull_Data matches the base initial RSN from the connection context, it indicates the data entries as received are the same order as the original order. The process may then proceed onto block 908. In contrast, when the RSN of the pull_Data does not match with or has missing data entries or has out of sequence/order data entries, the transition may then be retired, aborted, or asked to be transmitted, as shown in the loop 916, In block 908, once the data information of the pull_Data is determined in order, a pull response is then transmitted to the initiator ULP 510, 610 to complete the transmission process, as indicated by the communication path 627 depicted in FIG. 6.

In block 910, per connection context state may be updated based on the transmission in block 908. Once the transmission to the ULP 510, 610 is completed, the next incoming connection context is also checked to ensure if the transaction is in order.

In block 912, when the transaction matches the data entries and is available in the CAMs 708*b* in the reorder engine 706, the process may be looped back to block 908, as shown in arrow 914, and the pull_Data may then be continuously sent to the initiator ULP 510, 610 to complete the transmission process.

Figure 10:
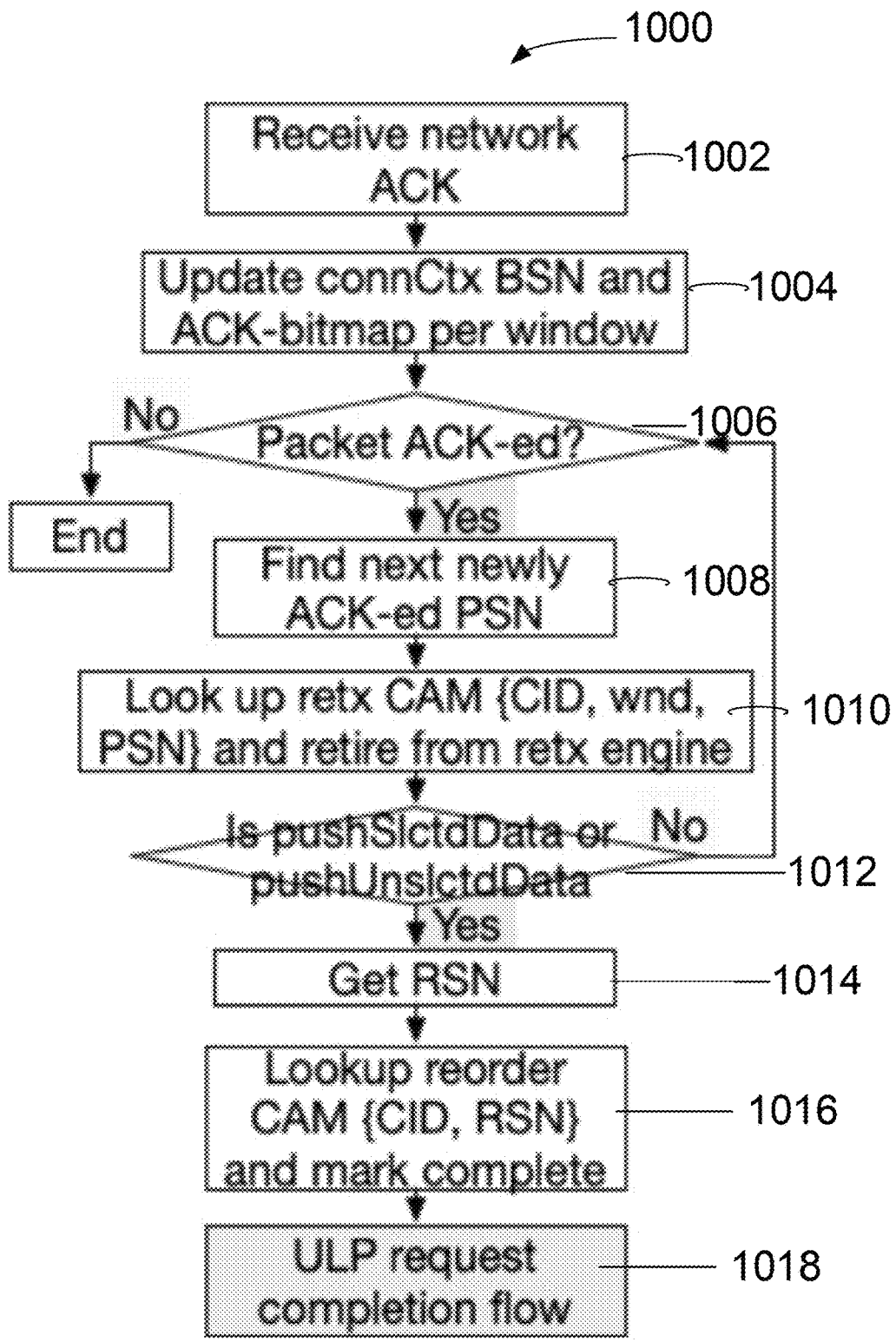

FIG. 10 depicts a flow block diagram illustrating a data transmission process 1000 at the initiator RT 530, 630 utilizing the reorder engine 706 and/or the transmission engine 704 during data transmission. The example depicted in FIG. 10 illustrates the push requests are completed, sending an acknowledgement from the target RT 540, 640 back to the initiator RT 530, 630, such as the communication oath 608 depicted in FIG. 6.

In block 1002, an acknowledgement (ACK) is received by the initiator RT 530, 630. It is noted that the acknowledgement (ACK) may be in form of received expected BSN in piggybacked ACK (ACK-eBSN) or expected BSN plus ACK-packet-bitmap in a dedicated ACK packet.

In block 1004, the BSN and the ACK-bitmap of the connect context (ConnCtx) per TX sliding window is updated. The initiator RT 530, 630 compares and updates the received ACK against locally stored TX sliding window.

In block 1006, after the comparison and updates, newly acknowledgements may be extracted from the ACK.

In block 1010, a look up operation is performed in the retransmission engine 704 so as to compare the ACK and the acknowledge with the look-up table saved in the CAM 708*a* to retire from the transmission engine.

In block 1012, in the example the packets being acknowledged is either a pushSlctdData or pushUnslctdData, in this regard, the transmission then proceeds to block 1014 to obtain their RSNs.

In block 1016, these packets may further be transmitted to the reorder engine 706 to perform another look-up operation.

In block 1018, after the packet are compared and acknowledged, a transaction is transmitted to initiator ULP 510, 610 based on their respective RSN and the transmission is marked completed.

Figure 11:
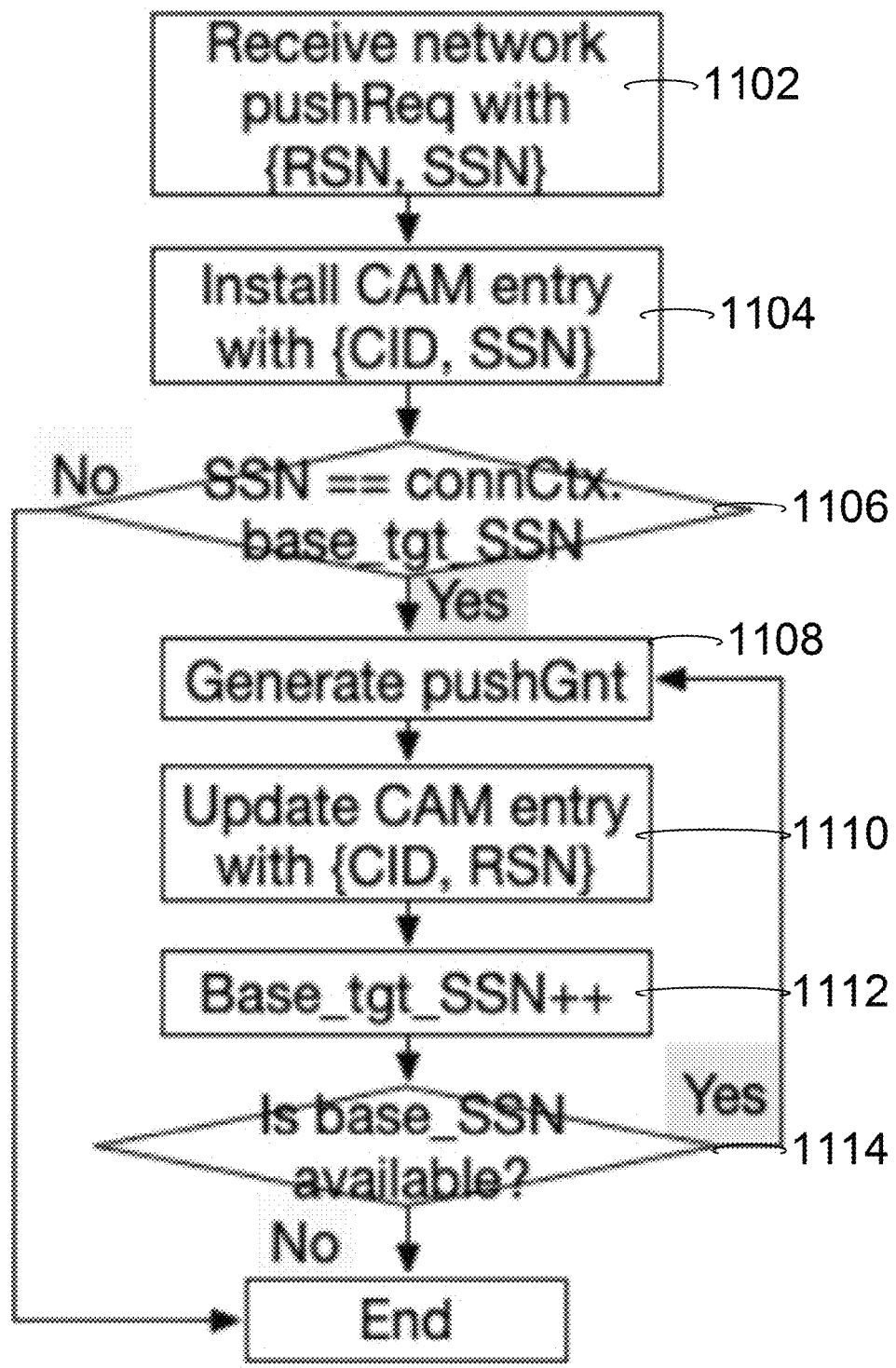
Figure 12:
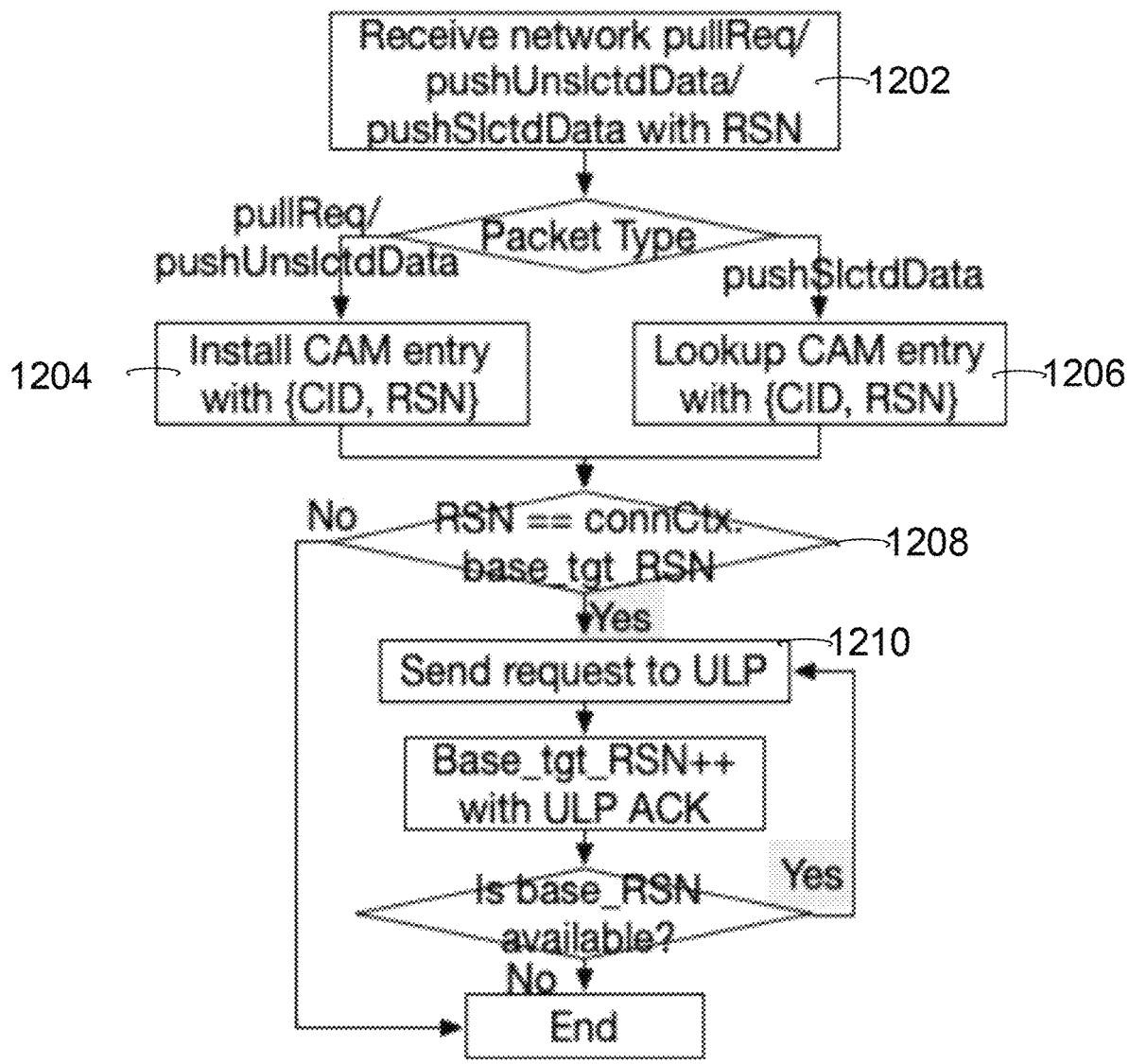

FIGS. 11 and 12 are examples of the data look-up operations performed at the target RT 540, 640. In the example depicted in FIG. 11, a request, such as a push request, may be received by the target RF 540, 640, such as the communication path 611, 612 depicted in FIG. 6. In the example depicted in FIG. 12, a request, such as a pull request or a push unsolicited data or push solicited data, may be received by the target RT 540, 640, such as the communication path 614, 613, 625 and 626 depicted in FIG. 6.

Referring back to FIG. 11, in block 1102, a push request is received by the target RT 540, 640. The push request may be sent from the initiator RT 530, 630. The packets of the push request as received may be granted in their SSN and RSN order.

In block 1104, as such push request is arrived at the target RT 540, 640 without prior encounter, the packets of the push request may then transmit through the reorder engine 706 in the target RT 540, 640. The packets with the plurality of sequence numbers, such as RSN, PSN or SSN, may then be transmitted through the reorder engine 706 to mark, register and store these data entries in the CAM 708b. The data saved in the CAM 708b may include some information including connection ID (CID), SSN, or RSN, that may help to identify, classify and mark these data entries and store such data entries in the CAM 708b for look-up when needed.

In block 1106, similarly, the packets are inspected to check if SSN matches the saved information in the packets.

In block 1108, a push grant may be generated to grant a pushSolctd Data to be transmitted to the target RT 540, 640.

Similar to the transmission discussed above, in block 1110, once the push grant is submitted, the data entries in the CAM 708b of the reorder engine 706 may be updated.

The subsequent block operations are similar to the operation described above so the description of these blocks is eliminated for the sake of brevity.

Referring now to FIG. 12, in block 1202, a request, such as a pull request, push unsolicited data or push solicited data, may be received by the target RT 540, 640.

Subsequently, based on the types of the requests, different transmission processes may be performed. For example, when the request is a pull request or a push unsolicited Data, the transmission may then proceed to block 1204 so that the data packets from the pull request or push unsolicited Data may be transmitted through the reorder engine 706 in the target RT 540, 640. The packets with the assigned sequence numbers, such as RSN or SSN, may then be transmitted through the reorder engine 706 to mark, register and store these data entries in the CAM 708b. The data saved in the CAM 708b may some information including connection ID (CID), SSN, or RSN, that may help to identify, classify and mark these data entries and store such data entries in the CAM 708b for look-up when needed.

In another example wherein the request is push solicited data, the transmission process may then proceed to block 1206 to perform a look-up operation. Similar to the description above, the look-up table previously saved or stored in the CAM 708b of the reorder engine 706 may allow the data packets of the push solicited data to be compared with the data entries saved therein so as to ensure the correct order or sequence of the data packet are received. If not, the operation may then be aborted, retired or dropped for further transmission. If so, the transmission process may then further go on to block 1210 to transmit the request and/or data to target ULP 520, 620 for data saving or further data processing. It is noted that some description of the blocks in some examples may be skipped for sake of brevity.

In some examples, the initiator RT 530, 630 and the target RT 540, 640 keep tracks of all outstanding TX packets in the retransmission engines 704. The retransmission engines 704 may review and inspect the data packets that are pending acknowledgements and determine for transmission per connection. It is noted that the RT protocol may additionally specify RSN order requirement during packet retransmission as needed. Similarly, the CAM 708a in the retransmission engines 704 may also provide a look-up operation to inspect the sequence of the data packet to determine is a retransmission is needed. During transmission, when the transmission time reaches time out, it indicates that the data packets may be lost, thus triggering a scanning process in the retransmission engine 704. The scanned data information may then be compared with the sequence of the data packet saved in the CAM 708a, such as performing the look-up operation, so as to determine is a retransmission is required to retransmit the lost data information.

Figure 13:
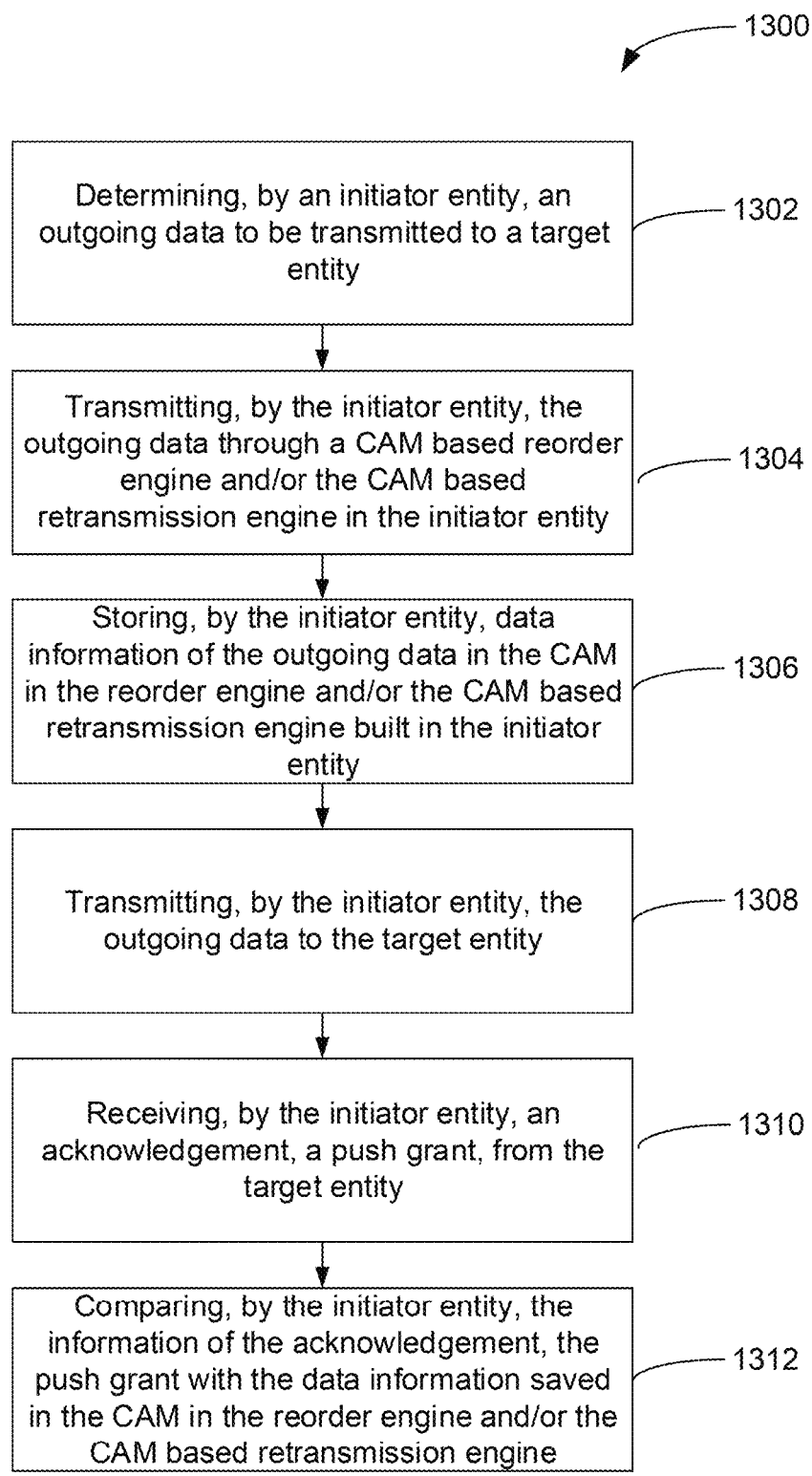
FIG. 13 is an example flow diagram according to aspects of the technology.

FIG. 13 shows an example flow diagram illustrating an example method 1300 in accordance with aspects of the disclosure. The method may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted. Although FIG. 13 illustrates one example method, variations of the methods may be performed, for instance as described above with reference to FIGS. 1-12.

Referring to FIG. 13, an example flow diagram 1300 is shown illustrating transactions that may utilizes the look-up operations provided from the CAM based reorder engine or retransmission engine. In the example depicted in FIG. 13, the CAM based reorder engine or retransmission engine is utilized in an initiator entity. The flow diagram 1300 may be performed by one or more entities in a network, such as by any of the entities A, B, C of FIG. 1, for example by processors 220 of FIG. 2. As mentioned above in reference to FIG. 2, the processors 220 may include processors on one entity, such as entity 110, or processors on multiple entities, such as on two or more of entities A, B, C, etc. As such, processors 220 may receive data, and perform reliable transport as described above with reference to FIGS. 1-12.

Referring to FIG. 13, in block 1302, an outgoing data is determined by an initiator entity to be transmitted to a target entity. In block 1304, the initiator entity transmits the determined outgoing data to the CAM based reorder and/or retransmission for sequencing, marking and registration prior to outputting to the target entity. In block 1306, such information may then save in the CAMs in the reorder and/or retransmission engine. In block 1308, after the sequence, order, or data information of the outgoing data is saved, the outgoing data is then transmitted to the target entity. In block 1310, after processing by the target entity, an incoming data transmitted from the target entity may then be received by the initiator entity. In block 1312, the incoming data is then compared with the data information saved in the CAMs in the reorder and/or retransmission engine to ensure the sequence or order of the data information is at the same order as the outgoing data originally transmitted to the initiator entity.

Figure 14:
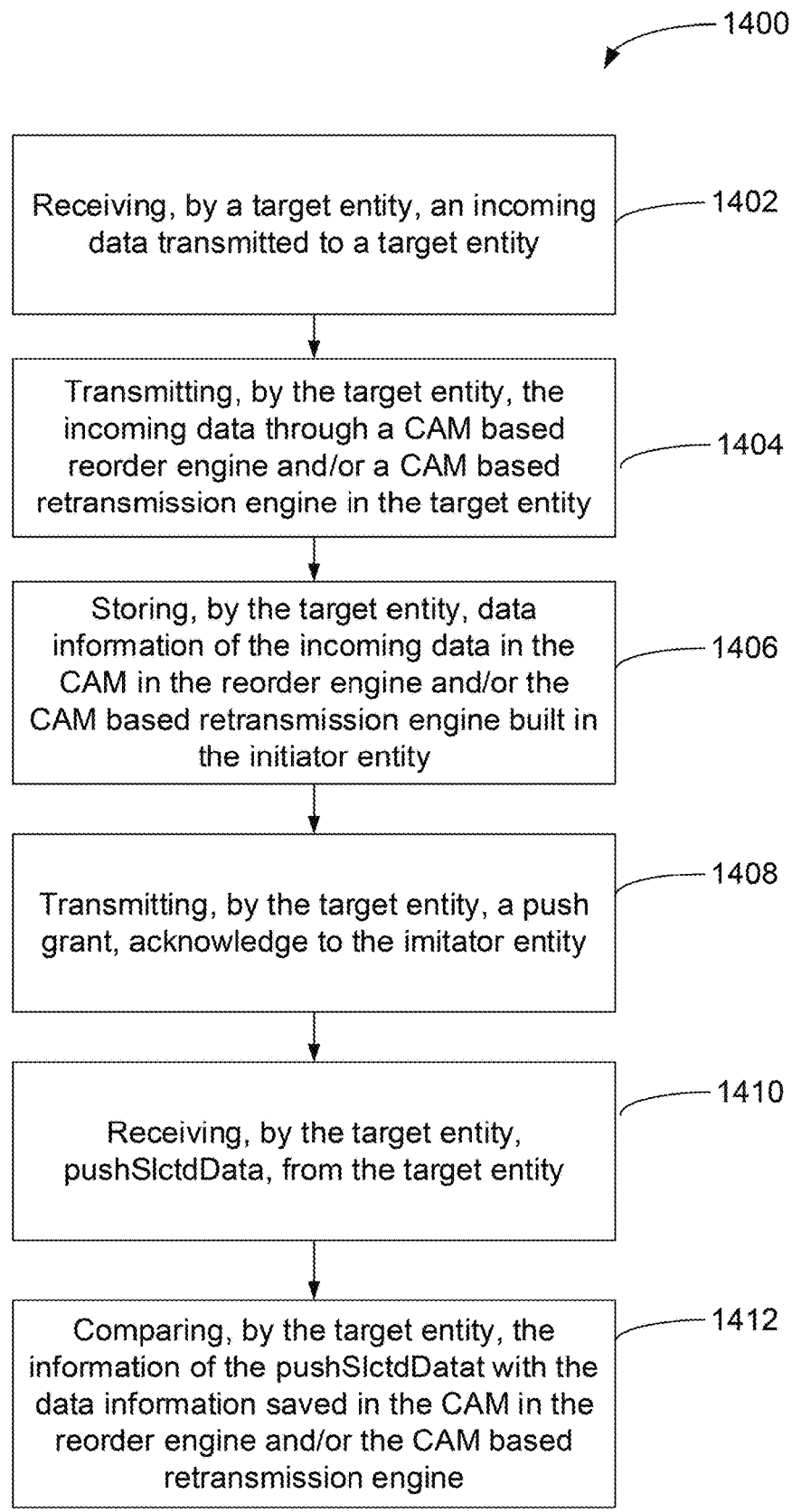
FIG. 14 is another example flow diagram according to aspects of the technology.

FIG. 14 shows an example flow diagram illustrating another example method 1400 in accordance with aspects of the disclosure. The method 1400 may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted. Although FIG. 14 illustrates one example method, variations of the methods may be performed, for instance as described above with reference to FIGS. 1-12.

Referring to FIG. 14, an example flow diagram 1400 is shown illustrating transactions that may utilizes the look-up operations provided from the CAM based reorder engine or retransmission engine. In the example depicted in FIG. 14, the CAM based reorder engine or retransmission engine is utilized in a target entity. The flow diagram 1400 may be performed by one or more entities in a network, such as by any of the entities A, B, C of FIG. 1, for example by processors 220 of FIG. 2. As mentioned above in reference to FIG. 2, the processors 220 may include processors on one entity, such as entity 110, or processors on multiple entities, such as on two or more of entities A, B, C, etc. As such, processors 220 may receive data, and perform reliable transport as described above with reference to FIGS. 1-12.

Referring to FIG. 14, in block 1402, an incoming data, such as a first set of incoming data, is received by a target entity transmitted from an initiator entity. In block 1404, the target entity transmits the incoming data to the reorder engine and/or retransmission engine for sequencing, marking and registration. In block 1406, such information may then save in the CAMs in the reorder and/or retransmission engine. In block 1408, after the sequence, order, or data information of the outgoing data is saved, a response data, such as a push grant or acknowledgement, is then transmitted to the initiator entity. In block 1410, after processing by the initiator entity, a second set of incoming data, such as pushSlctdData, transmitted from the initiator entity may then be received by the target entity. In block 1412, the second set of the incoming data is then compared with the data information saved in the CAMs in the reorder and/or retransmission engine to ensure the sequence or order of the data information is at the same order as the first set of the incoming data originally transmitted to the target entity.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A reorder engine, comprising:
   a content addressable memory (CAM);
   one or more processors in communication with the CAM, the one or more processors configured to:
      receive a first set of data packets when executed by the one or more processors;
      access the content addressable memory to process the first set of data packets;
      save data information of the first set of the data packets in the content addressable memory;
      receive a second set of data packets;
      access the content addressable memory to process the second set of data packets received by the reorder engine;
      compare data information of the second set of the data packets with the data information of the first set of the data packets;
      determine if the second set of the data packets has out of order data packets; and
      reorder the out of order data packets prior to outputting the second set of the data packets.

2. The reorder engine of claim 1, wherein the data information comprises a connection content and a sequence of numbers that identify an order of the data packets.

3. The reorder engine of claim 1, wherein the one or more processors are further configured to perform Remote Direct Memory Access (RDMA) operations.

4. A method, comprising:
   receiving, by one or more processors, a first set of data packets from an input operation in a computing system;
   identifying, by one or more processors, a first plurality of sequence numbers associated with the first set of the data packet; and
   saving, by one or more processors, a first order of the first plurality of sequence numbers in a content addressable memory in a reorder engine in the computing system prior to outputting the first set of data packets;
   identifying, by one or more processors, a second plurality of sequence numbers associated with a second set of the data packet from the input operation;
   comparing, by one or more processors, a second order of the second plurality of sequence numbers with the first plurality of sequence numbers;
   identifying out-of-order data packets in the second plurality of data packets; and
   reordering the out-of-order data packets to match with the first order prior to outputting the second plurality of data packets.

5. The method of claim 4, further comprising:
   saving, by one or more processors, data information associated with the first set of the data packets in a content addressable memory in a retransmission engine in the computing system.

6. The method of claim 5, further comprising:
   tracking, by one or more processors, data packets active in the computing system.

7. The method of claim 6, further comprising:
   determining, by one or more processors, if a retransmission of data packets is necessary.

8. The method of claim 4, wherein the input operation is a Remote Direct Memory Access (RDMA) operation.

9. The method of claim 4, wherein the first set of the data packet comprises one or more of push requests, pull requests, push solicited data, push unsolicited data, or acknowledges.

10. The method of claim 4, wherein the second set of data packet comprises one or more of push grant, push unsolicited data, pull response or acknowledgement.

11. A method, comprising:
   receiving, by an initiator entity, a plurality of data packets from an input operation;
   saving, by the initiator entity, data information in relation to the plurality of the data packets in a content addressable memory in a reorder engine in the initiator entity;
   transmitting, by the initiator entity, the plurality of the data packets to a target entity;
   receiving, by the initiator entity, a response from the target entity; and
   performing, by the initiator entity, a look-up operation, in the content addressable memory in the reorder engine to compare the data information between the first plurality of data packets and the response;
   updating, by the initiator entity, the data information from the response; and
   reordering out of order data packets from the response.

12. The method of claim 11, wherein the data information comprises a plurality of sequence numbers of the data packets.

13. The method of claim 11, wherein the input operation is a Remote Direct Memory Access (RDMA) operation.

* * * * *